US005423835A

United States Patent [19]

Green et al.

[11] Patent Number: 5,423,835

[45] Date of Patent: Jun. 13, 1995

[54] APPARATUS AND METHOD FOR APPLYING SURGICAL CLIPS IN LAPAROSOPIC OR ENDOSCOPIC PROCEDURES

[75] Inventors: David T. Green, Westport; Henry Bolanos, East Norwalk, both of Conn.; Wayne P. Young, Brewster, N.Y.; Richard A. McGarry; Lisa W. Heaton, both of Norwalk, Conn.; Keith Ratcliff, Sandy Hook, Conn.

[73] Assignee: United States Surgical Corporation, Norwalk, Conn.

[21] Appl. No.: 860,650

[22] Filed: Mar. 30, 1992

Related U.S. Application Data

[63] Continuation of Ser. No. 381,265, Jul. 18, 1989, Pat. No. 5,100,420.

[51] Int. Cl.[6] .............................................. A61B 17/04

[52] U.S. Cl. ..................................... 606/143; 227/901

[58] Field of Search ................ 606/142, 143; 227/901, 227/902, 19

[56] References Cited

U.S. PATENT DOCUMENTS

D. 276,650 12/1984 Green et al. ......................... D24/26
2,008,367 7/1935 Rhinevault .
2,741,248 4/1956 Woodhall .
2,968,041 1/1961 Skold .
3,585,985 6/1971 Gould .
3,603,310 9/1971 Mottin et al. .
3,631,707 1/1972 Miller .
3,777,538 12/1973 Weatherly et al. .
3,834,392 9/1974 Lampman et al. .
3,848,773 11/1974 Adler et al. .
3,856,016 12/1974 Davis .
3,870,048 3/1975 Yoon .
3,882,854 5/1975 Hulka et al. ........................... 128/6
3,954,108 5/1976 Davis .
3,955,581 5/1976 Spasiano et al. .
3,989,049 11/1976 Yoon .
4,027,510 6/1977 Hiltebrandt .
4,038,987 8/1977 Komiya .
4,064,881 12/1977 Meredith .
4,084,594 4/1978 Mosior .
4,085,743 4/1978 Yoon .
4,101,063 7/1978 Kapitanov et al. .
(List continued on next page.)

FOREIGN PATENT DOCUMENTS 409569 7/1990 European Pat. Off. .
0406724 9/1991 European Pat. Off. .
900376 4/1990 France .
(List continued on next page.)

OTHER PUBLICATIONS

"Information About Dimethyl Silicone Compounds," Dow Corning, 1988.
"Laparoscopic Sterilization with Electrocautery, Spring-Loaded Clips, and Silastic Bands: Technical Problems and Early Complications," Fertility and Sterility, vol. 27, No. 3, Mar. 1976.
"A Clip Applicator for Laparoscopic Sterlization," Fertility and Sterility, vol. 27, No. 9, Sep. 1976.
"Laparoscopic Sterilization with Spring-Loaded Clips: Double-Puncture Technique," The Journal of Reproductive Medicine, vol. 18, No. 5, May 1977.
(List continued on next page.)

*Primary Examiner*—Stephen C. Pellegrino
*Assistant Examiner*—Gary Jackson

[57] ABSTRACT

An apparatus for applying surgical clips through an endoscopic tube includes an endoscopic portion housing a jaw blade, a pusher bar for feeding clips one at a time to the jaws, a channel bar for camming the jaw blades into closed position, and an array of surgical clips. The body of the apparatus comprises a frame housing an actuating mechanism and a transmission mechanism for transferring movement to the pusher bar and channel. The endoscopic portion is rotatable relative to the frame. In one embodiment the apparatus is a single disposable unit. In an alternative embodiment the endoscopic portion is detachable and disposable whereas the non-endoscopic body portion is reusable.

9 Claims, 27 Drawing Sheets

U.S. PATENT DOCUMENTS

| | | | |
|---|---|---|---|
| 4,103,680 | 8/1978 | Yoon . | |
| 4,152,920 | 5/1979 | Green . | |
| 4,166,466 | 9/1979 | Jarvik . | |
| 4,169,476 | 10/1979 | Hiltebrandt . | |
| 4,185,762 | 1/1980 | Froehlich . | |
| 4,188,953 | 2/1980 | Klieman et al. . | |
| 4,196,836 | 4/1980 | Becht . | |
| 4,226,239 | 10/1980 | Polk et al. . | |
| 4,226,242 | 10/1980 | Jarvik . | |
| 4,228,895 | 10/1980 | Larkin . | |
| 4,230,116 | 10/1980 | Watson . | |
| 4,240,411 | 12/1980 | Hosono . | |
| 4,242,902 | 1/1981 | Green . | |
| 4,246,903 | 1/1991 | Larkin . | |
| 4,257,419 | 3/1981 | Goltner et al. . | |
| 4,273,129 | 6/1981 | Boebel . | |
| 4,296,751 | 10/1981 | Blake, III et al. . | |
| 4,299,224 | 11/1981 | Noiles . | |
| 4,316,468 | 2/1982 | Klieman et al. . | |
| 4,325,376 | 4/1982 | Klieman et al. . | |
| 4,325,377 | 4/1982 | Boebel . | |
| 4,335,928 | 1/1982 | Barrett et al. . | |
| 4,338,947 | 7/1982 | Williams . | |
| 4,367,746 | 1/1983 | Derechinsky . | |
| 4,372,316 | 2/1983 | Blake, III et al. . | |
| 4,374,523 | 2/1983 | Yoon . | |
| 4,393,883 | 7/1983 | Smyth et al. . | |
| 4,412,539 | 11/1983 | Jarvik . | |
| 4,425,915 | 1/1984 | Ivanov . | |
| 4,430,997 | 2/1984 | DiGiovanni et al. . | |
| 4,440,170 | 4/1984 | Golden et al. . | |
| 4,450,839 | 5/1984 | Transue . | |
| 4,452,357 | 6/1984 | Klieman et al. . | |
| 4,452,376 | 6/1984 | Klieman et al. . | |
| 4,471,780 | 9/1984 | Menges et al. . | |
| 4,479,489 | 10/1984 | Tucci . | |
| 4,480,641 | 11/1984 | Failla et al. . | |
| 4,481,952 | 11/1984 | Pawelec . | |
| 4,492,232 | 1/1985 | Green . | |
| 4,505,414 | 3/1985 | Filioi | 227/19 |
| 4,509,518 | 4/1985 | McGarry et al. . | |
| 4,512,345 | 4/1985 | Green . | |
| 4,522,207 | 6/1985 | Klieman et al. . | |
| 4,532,925 | 8/1985 | Blake, III . | |
| 4,534,351 | 8/1985 | Rothfuss et al. . | |
| 4,549,544 | 10/1985 | Favaron . | |
| 4,550,715 | 11/1985 | Santangelo et al. . | |
| 4,557,263 | 12/1985 | Green . | |
| 4,558,706 | 12/1985 | Nakada et al. . | |
| 4,562,839 | 1/1986 | Blake, III et al. | 606/143 |
| 4,572,183 | 2/1986 | Juska . | |
| 4,576,166 | 3/1986 | Montgomery et al. . | |
| 4,589,421 | 5/1986 | Ullman . | |
| 4,598,711 | 7/1986 | Deniega . | |
| 4,611,595 | 9/1986 | Klieman et al. . | |
| 4,616,650 | 10/1986 | Green et al. . | |
| 4,624,254 | 11/1986 | McGarry | 227/19 |
| 4,633,882 | 1/1987 | Matsuo et al. | 128/660 |
| 4,646,740 | 3/1987 | Peters et al. . | |
| 4,649,904 | 3/1987 | Krauter et al. | 128/6 |
| 4,662,373 | 5/1987 | Montgomery et al. | 606/143 |
| 4,662,374 | 5/1987 | Blake, III . | |
| 4,674,501 | 6/1987 | Greenberg . | |
| 4,674,504 | 6/1987 | Klieman et al. . | |
| 4,682,491 | 7/1987 | Pickard . | |
| 4,691,853 | 9/1987 | Storace . | |
| 4,700,694 | 10/1987 | Shishido | 128/6 |
| 4,712,549 | 12/1987 | Peters et al. | 606/143 |
| 4,759,364 | 7/1988 | Boebel . | |
| 4,784,137 | 11/1988 | Kulik et al. . | |
| 4,841,888 | 6/1989 | Mills et al. . | |

(List continued on next page.)

FOREIGN PATENT DOCUMENTS

| | | |
|---|---|---|
| 2330182 | 1/1975 | Germany . |
| 2546696 | 4/1976 | Germany . |
| 3802651 | 2/1989 | Germany . |

(List continued on next page.)

OTHER PUBLICATIONS

"Results of Experimental Endoscopic Esophagel Varix Ligation," The American Surgeon, Jan. 1988.

"Laparoscopic Sterilization with the Spring Clip: Instrumentation development and Current Clinical Experience," American Journal of Obstetrics and Gynecology, vol. 135, No. 8, Dec. 15, 1979.

Karl Storz Endoscopy-America Promotional Advertisement, "It's Your Choice for Tubal Sterilization," 1981.

"Metal Clip Techniques Utilizing Pistol Grip Appliers," The American Journal of Surgery, Feb. 1982.

"An Applicator for the Hulka Fallopian Tube Clip," American Journal of Obstetrics and Gynecology, vol. 139, No. 6, Mar. 15, 1982.

(List continued on next page.)

U.S. PATENT DOCUMENTS

| | | | |
|---|---|---|---|
| 4,850,350 | 7/1989 | Jackson | 128/207.16 |
| 4,850,355 | 7/1989 | Brooks et al. . | |
| 4,858,608 | 4/1990 | McQuilkin . | |
| 4,874,364 | 10/1989 | Morris et al. | 604/35 |
| 4,900,307 | 2/1990 | Kulli | 604/110 |
| 4,919,152 | 7/1990 | Ger | 128/898 |
| 4,935,010 | 6/1990 | Cox et al. | 604/122 |
| 4,944,443 | 7/1990 | Oddsen et al. | 128/898 |
| 5,026,379 | 6/1991 | Yoon | 606/141 |
| 5,030,226 | 7/1991 | Green et al. . | |
| 5,040,715 | 8/1991 | Green et al. | 227/176 |
| 5,049,152 | 9/1991 | Simon et al. . | |
| 5,084,057 | 1/1992 | Green et al. . | |
| 5,100,418 | 3/1992 | Yoon et al. . | |
| 5,100,420 | 3/1992 | Green et al. . | |
| 5,104,395 | 4/1992 | Thornton et al. | 606/143 |

FOREIGN PATENT DOCUMENTS

| | | |
|---|---|---|
| 2054384 | 2/1981 | United Kingdom . |
| 1093329 | 5/1984 | U.S.S.R. . |
| 8910094 | 4/1989 | WIPO . |

OTHER PUBLICATIONS

"Laparoscopic Sterilization with Spring Clips," Richard Wolf Instruction Manual, (1985) Jaroslav F. Hulka, M.D.

Information Booklet for Auto Suture ® Premium Surgiclip TM Titanium Disposable Automatic Clip Appliers (1989).

Information Booklet for Auto Suture ® Skin and Fascia Surgical Stapling Instruments and Disposable Loading Units (1981).

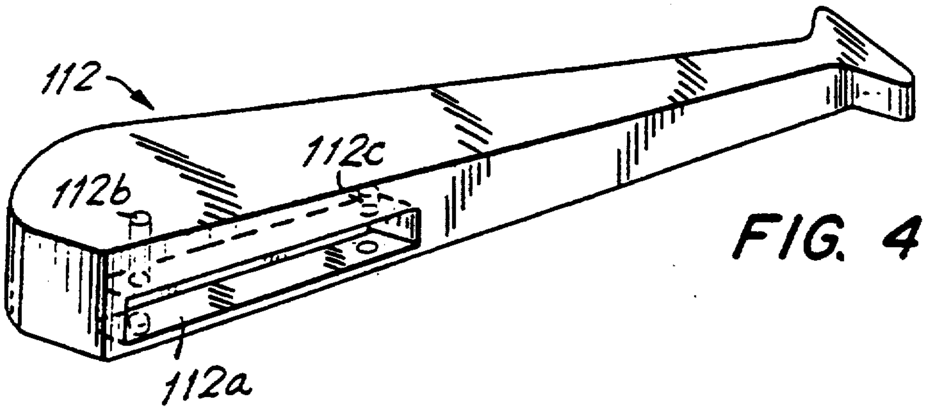
FIG. 4
FIG. 5
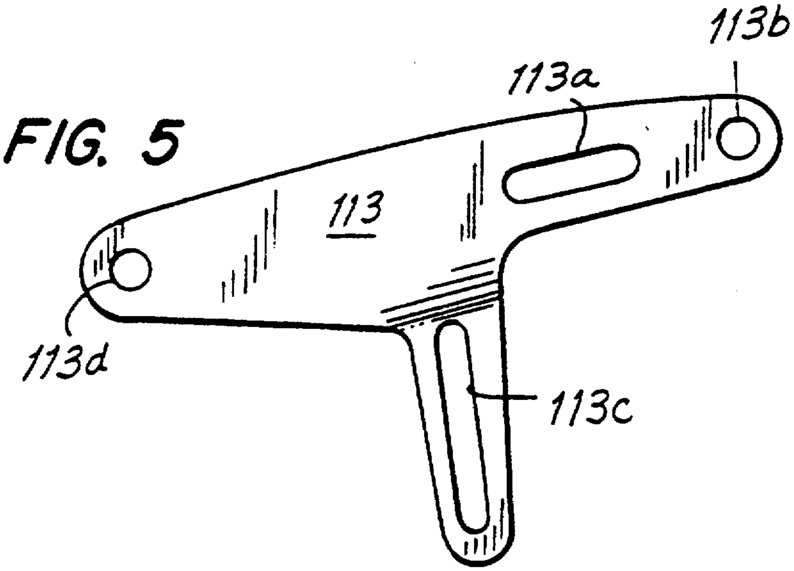
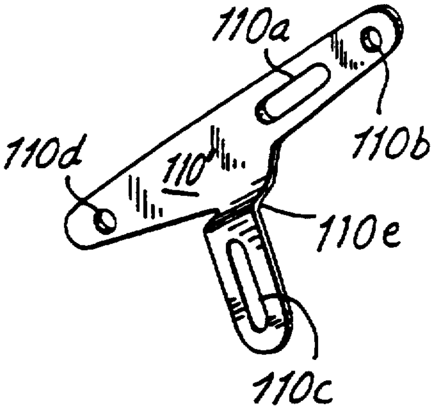
FIG. 6
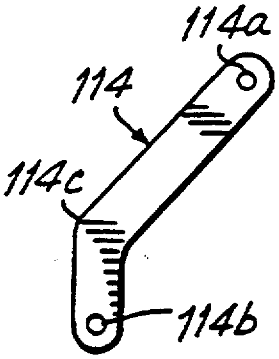
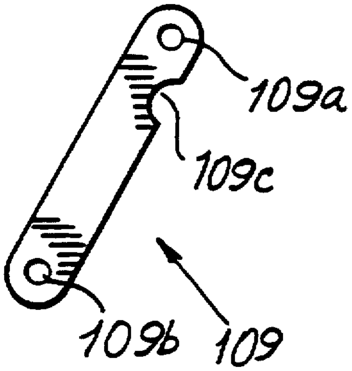
FIG. 7
FIG. 8

FIG. 9
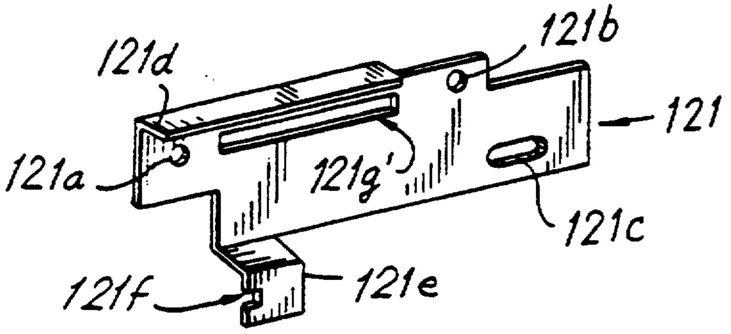
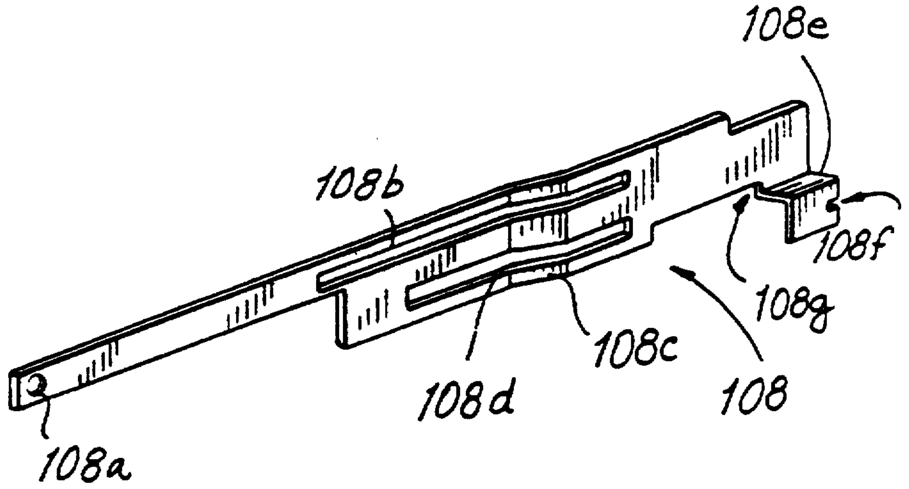
FIG. 10

FIG. 13a
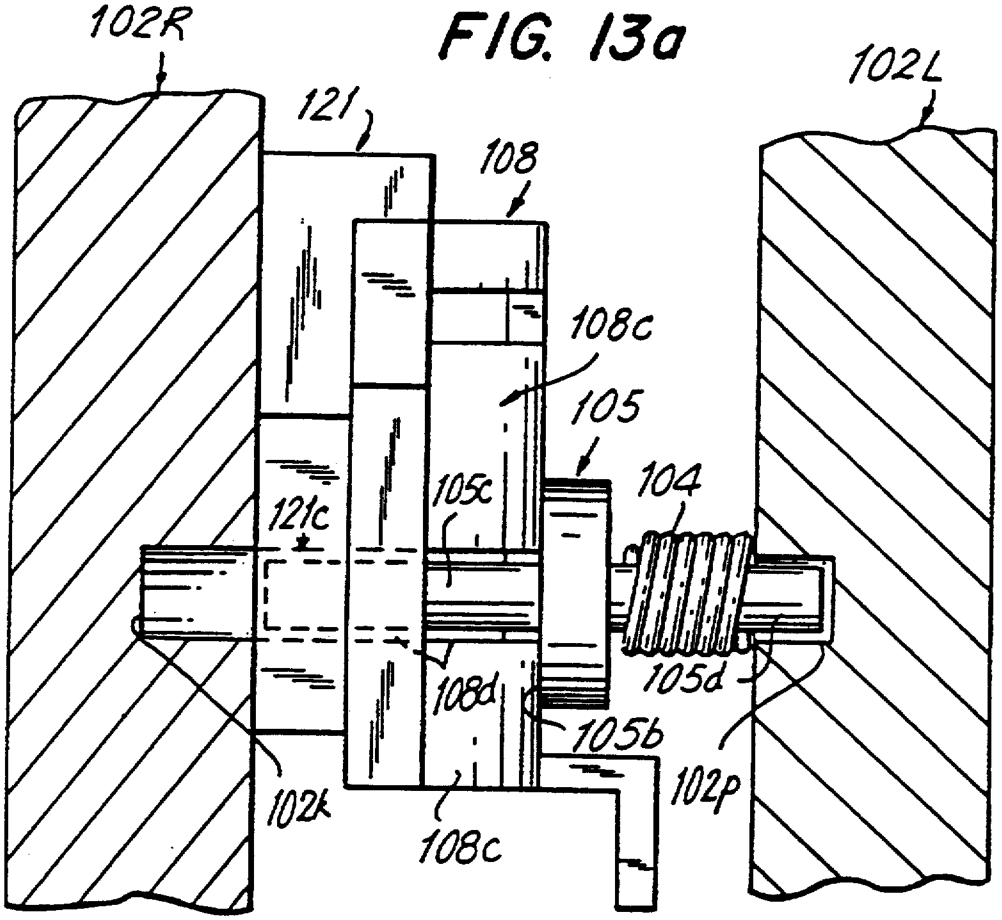
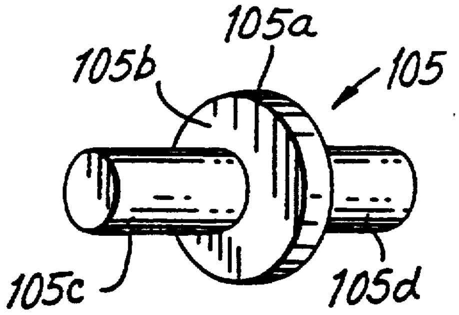
FIG. 14

FIG. 19a
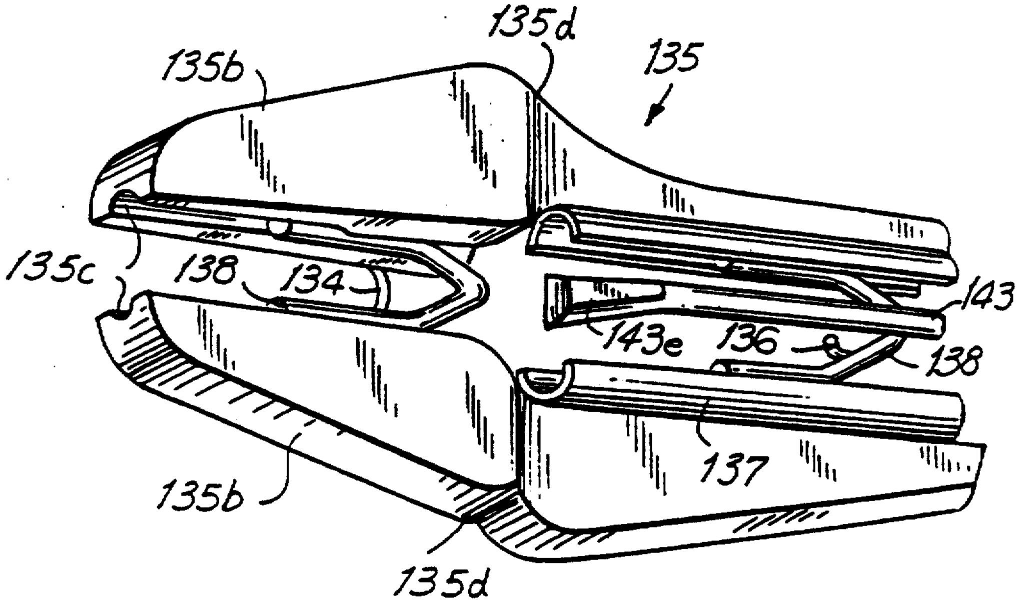
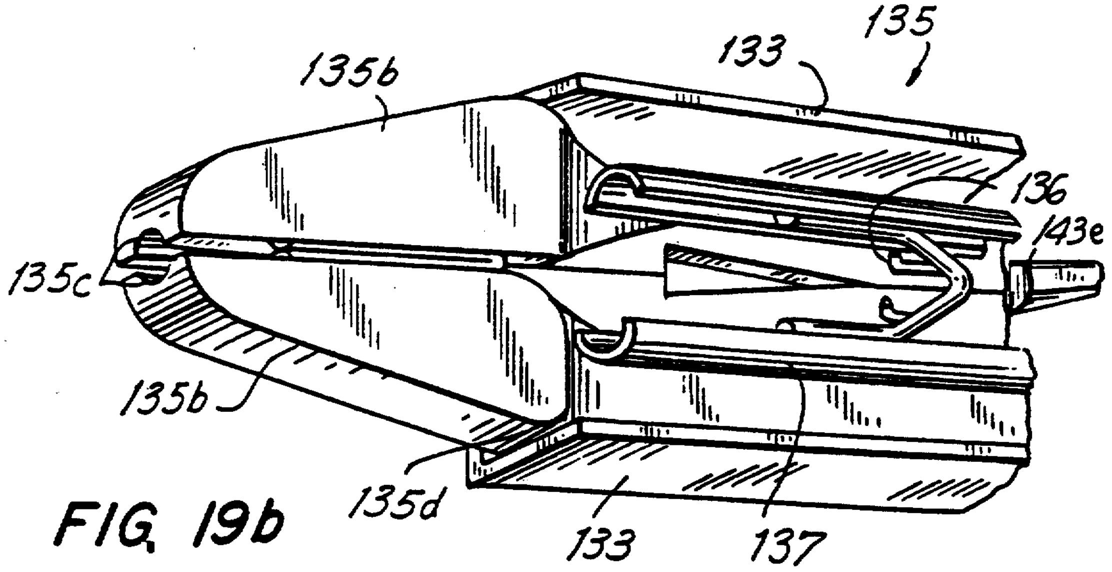
FIG. 19b

FIG. 25
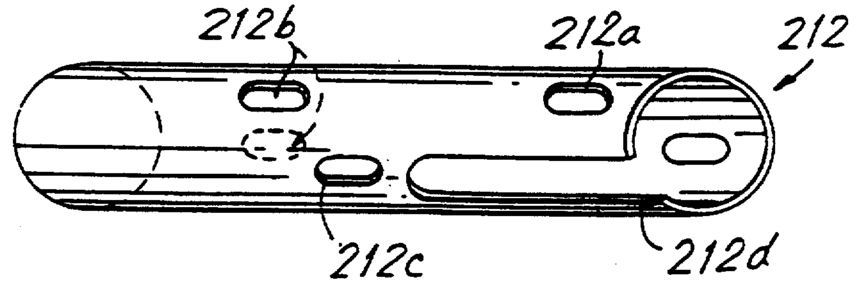
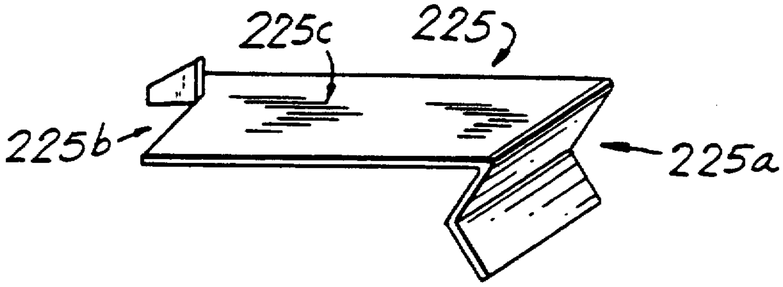
FIG. 26
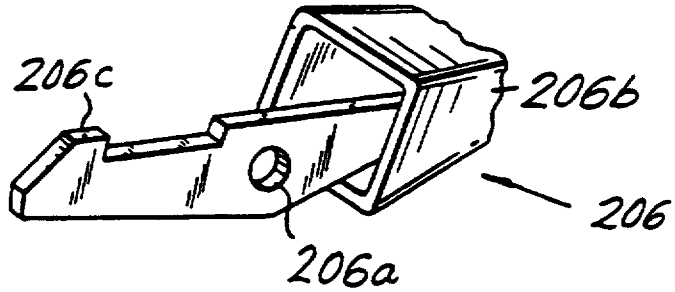
FIG. 27

APPARATUS AND METHOD FOR APPLYING SURGICAL CLIPS IN LAPAROSOPIC OR ENDOSCOPIC PROCEDURES

This is a continuation of U.S. application Ser. No. 07/381,265 filed Jul. 18, 1989, now U.S. Pat. No. 5,100,420.

BACKGROUND OF THE INVENTION

1. Field of the Invention

This invention relates to an apparatus and method for applying surgical clips, especially hemostatic clips, to body tissue such as blood vessels. More particularly, this invention relates to a surgical clip applier which can be used in laparoscopic or endoscopic procedures, and a method for using same.

2. Background of the Related Art

In surgical operations it is often necessary to apply hemostatic clips to blood vessels, and apparatus for applying clips are known in the art. See, for example, U.S. Pat. No. 4,616,650, and 4,624,254, both of which are hereby incorporated by reference, which disclose a surgical clip applying apparatus having a pair of ring-like handles. The handles are squeezed to force jaws to move distally relative to the apparatus where they are forced together by a pair of inclined surfaces. A surgical clip between the jaws is thereby squeezed closed.

In laparoscopic procedures surgery is performed in the interior of the abdomen through a small incision; in endoscopic procedures surgery is performed in any hollow viscous of the body through narrow endosopic tubes inserted through small entrance wounds in the skin. Laparoscopic and endoscopic procedures generally require that any instrumentation inserted into the body be sealed, i.e., provisions must be made to ensure that gases do not enter or exit the body through the laparoscopic or endoscopic incision as, for example, in surgical procedures in which the surgical region is insufflated. Moreover, laparoscopic and endoscopic procedures often require the surgeon to act on organs, tissues, and vessels far removed from the incision, thereby requiring that any instruments to be used in such procedures be both long and narrow. Up to now there have been no instruments for placing surgical clips in laparoscopic or endoscopic procedures.

Because endoscopic procedures are more common than laparoscopic procedures, the present invention shall be discussed in terms 6f endoscopic procedures and apparatus. However, use herein of terms such as "endoscopic", "endoscopically" and "endoscopic portion", among others, refer generally to instruments having elongated and relatively narrow operating portions for inserting into a cannula or a small wound in the skin and should not construed to limit the present invention to an apparatus for applying surgical clips only in conjunction with an endoscopic tube. To the contrary, it is believed that the present invention may find use in any procedure where access is limited to a small incision, including, but not limited to laparoscopic procedures.

SUMMARY

In accordance with the present invention a surgical apparatus is provided for applying surgical clips to blood vessels or other body tissue.

Briefly, a clip applier of the present invention comprises a) a frame, b) an endoscopic portion defining a longitudinal axis and extending distally from said frame, said endoscopic portion comprising:

i) means:for storing a plurality of surgical clips;

ii) clip closing means including jaw means, and camming means for closing said jaw means;

iii) means for individually advancing the surgical clips one at a time to said jaw means.

The ability to rotate the endoscopic portion independently from the body of the instrument greatly facilitates its use in endoscopic procedures. Further includable features are first transmission means for linearly transmitting movement along the axis of the apparatus from the actuating means to the clip closing means, and second transmission means for linearly transmitting movement along the axis of the apparatus from the actuating means to the means for feeding the surgical clips to the jaw means; and locking means for locking the apparatus such that once the jaw means have been actuated the apparatus cannot be reactivated until the locking means is released.

In one embodiment of the present invention the frame and endoscopic portion of the apparatus are not separable and the apparatus is intended to be completely disposable.

In another embodiment of the present invention the endoscopic portion is formed as a disposable unit detachable from a reusable frame and handle portion.

According to a method of the present invention the endoscopic portion of the apparatus is inserted into the body through a small incision or, more likely, through an endoscopic tube. The blood vessel or other tissue to be clipped is engaged by the jaws of the apparatus. A clip is positioned between the jaws and the jaws are closed, thereby applying the clip to the blood vessel.

The apparatus of the present invention advantageously permits a surgeon to perform internal clip application without full access to the operation site, i.e., without providing a large opening in the body to allow access to the operation site. The frame and handle portion of the apparatus are manipulated outside of the patient's body. Additionally the endoscopic portion may be rotated so as to facilitate positioning of the clip.

The ability to apply surgical clips through a small incision or tube dramatically reduces blood loss, tissue trauma, and patient recovery time, thereby contributing to improved health care practices.

BRIEF DESCRIPTION OF THE DRAWINGS

FIG. 4 illustrates a perspective view of the handle;

FIG. 5 illustrates a side view of the right toggle lever;

FIG. 6 illustrates a perspective view of the left toggle lever;

FIG. 7 illustrates a side view of the pusher bar front link;

FIG. 8 illustrates a side view of the pusher bar rear link;

FIG. 9 illustrates a perspective view of the rear channel;

FIG. 10 illustrates a perspective view of the rear pusher bar;

FIGS. 13*a* and 13*b* illustrate a front view of the channel lock pin in the unlocked and locked positions, respectively;

FIG. 14 illustrates the channel lock pin in perspective view;

FIGS. 19*a* and 19*b* illustrate in perspective view the closing of the jaw blade to apply a surgical clip;

FIGS. 25 and 25*a* illustrate the channel tube of an alternative embodiment in perspective and side sectional views, respectively.

FIG. 26 illustrates the leaf spring of an alternative embodiment;

FIG. 27 illustrates the release button of an alternative embodiment;

DETAILED DESCRIPTION OF PREFERRED EMBODIMENTS

Figure 1:
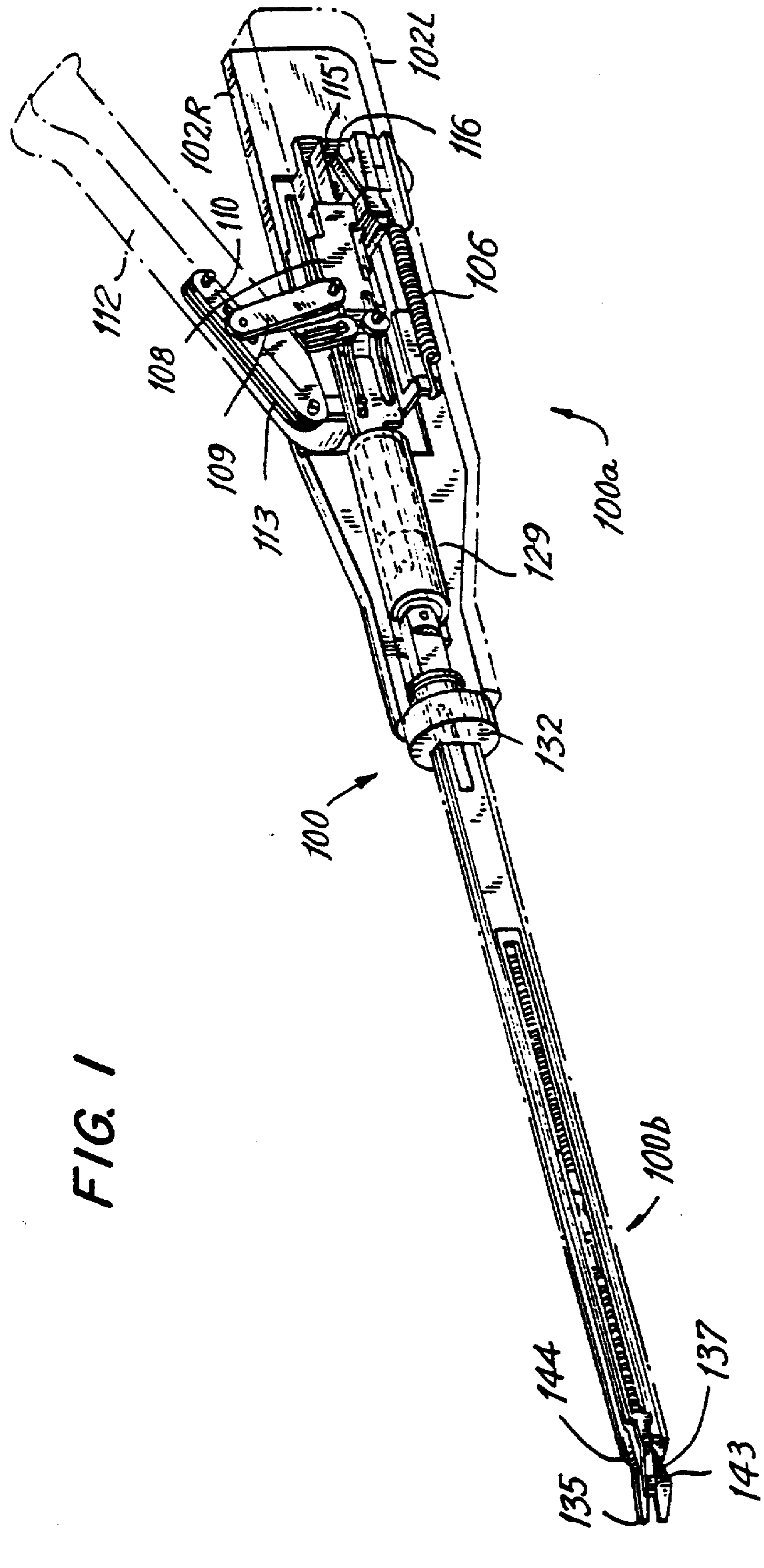
FIG. 1 illustrates a cutaway perspective view of one embodiment of the present invention.

The surgical apparatus described herein is adapted to apply surgical clips to blood vessels and the like, in endoscopic or laparoscopic procedures.

The apparatus or instrument generally comprises a frame which is of a size convenient for being held in the hand and which houses the non-endoscopic body of the apparatus. An endoscopic portion defining a longitudinal axis extends distally from the frame and is rotatable around the longitudinal axis relative to the frame. The endoscopic portion is a long tube-like portion having a relatively narrow outer diameter (e.g., about 10 millimeters) for insertion into an endoscopic tube such as a trocar cannula, or a small incision.

The endoscopic portion comprises means for holding a longitudinal array of surgical clips, such as a track, with a spring means to bias the clips forward in the distal direction. The clips are generally U-shaped pieces of integral construction and comprise two spaced apart legs connected by a bridge portion. The endoscopic portion has a clip closing means comprising a pair of flexible opposing jaws which are cammed together into closure by a distally-moving channel, and means such as a spring mounted pusher bar for advancing the surgical clips one at a time to the jaws.

The apparatus further has actuating means such as a pivoting handle and connecting links and levers which are part of a transmission means for transferring the pivotal movement of the actuating means linearly along the instrument axis to both the clip closing and clip advancing means. The apparatus also includes tubular members with circumferential coupling means such as circumferential notches or projections, which allow a connection of the endoscopic portion to the frame such that linear actuation movement may be transmitted thereto while allowing the endoscopic portion to rotate around the instrument axis.

The apparatus further comprises a locking means such that once the jaw means have been actuated and opened, the apparatus cannot be reactuated until the locking means is released, usually by a release button. The locking means comprises a resilient catch (such as a catch in conjunction with a spring) which is movable in response to actuation of the apparatus, i.e., application of a clip, from an unlocked position to a locked position. In the locked position, the locking means is engaged, thereby preventing linear transfer of movement to the clip closing means by the transmission means. Preferably two spring catches are used, one for locking the transmission means for actuating the clip advancing mechanism (e.g., pusher bar), and a second catch for locking the transmission means for actuating the jaw closing means (e.g., the channel). Pressing the release button releases both the first and second catches. The first catch is released directly thereby allowing the first transmission means to slide forward, and the second catch is released in response to the forward movement of the first transmission means.

As mentioned above, endoscopic instrumentation is usually required to have a gaseous seal to prevent communication of gases through the endoscopic incision. This gaseous seal may be accomplished in the apparatus of the present invention by providing close tolerances between the outer diameter of the endoscopic portion and the inner diameter of the trocar cannula through which it is inserted, and by providing close tolerances for the internal moving parts of the endoscopic portion. Thus adapted, the instrument of the present invention will provide a suitable gaseous seal.

Figure 35:
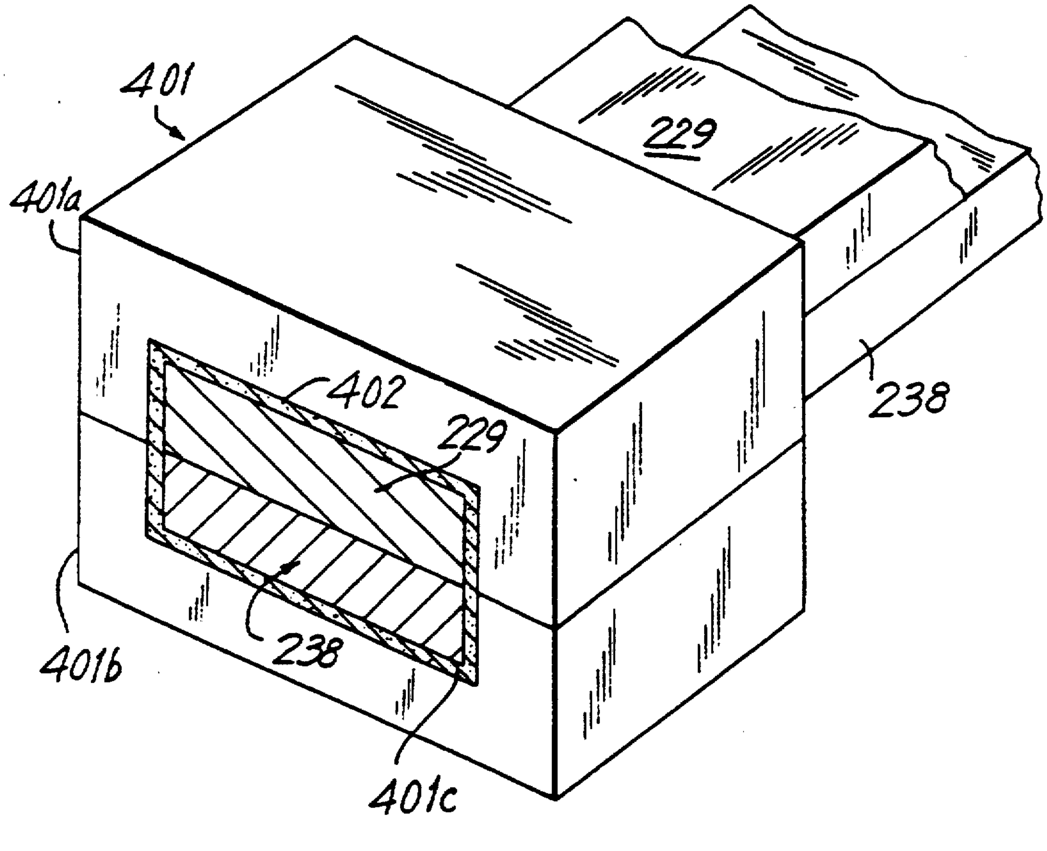
FIG. 35 illustrates the sealing block in perspective view.

Optimally, the gaseous sealing means comprise sealing block 401, as illustrated in FIG. 35. Sealing block 401 comprises U-shaped upper and lower portions 401*a* and 401*b*, respectively, which are positioned together so as to define an axially extending opening 401*c* through which components such as channel 238 and pusher 229 may be disposed. The inner surface of opening 401*c* is in close contiguity with the surface of the components disposed therethrough. A layer of silicone grease 402 may be employed to prevent gases from leaking between the surfaces. The sealing block 401 may be located within the cover tube 144 or the cartridge portions 228 and 239 of the embodiments disclosed herein. See, for example, FIGS. 18 and 29.

After the clipping operation has been completed the instrument may be removed from the body. In one embodiment of the present invention the entire instrument may be discarded. In another embodiment the endoscopic portion may be detached and discarded, and the frame and handle portion may be retained for a subsequent reuse with a replacement of the endoscopic portion.

FIG. 1 shows a cutaway perspective view of one embodiment of the present invention 100 which generally comprises an actuating body 100a supporting a non-detachable endoscopic portion 100b. Included are means for actuating the instrument, transmission means, means for applying a surgical clip to a blood vessel or the like, means for locking the instrument, and means for unlocking the instrument and repositioning another clip. Clip applier 100 is intended to be fully disposable.

Figure 2:
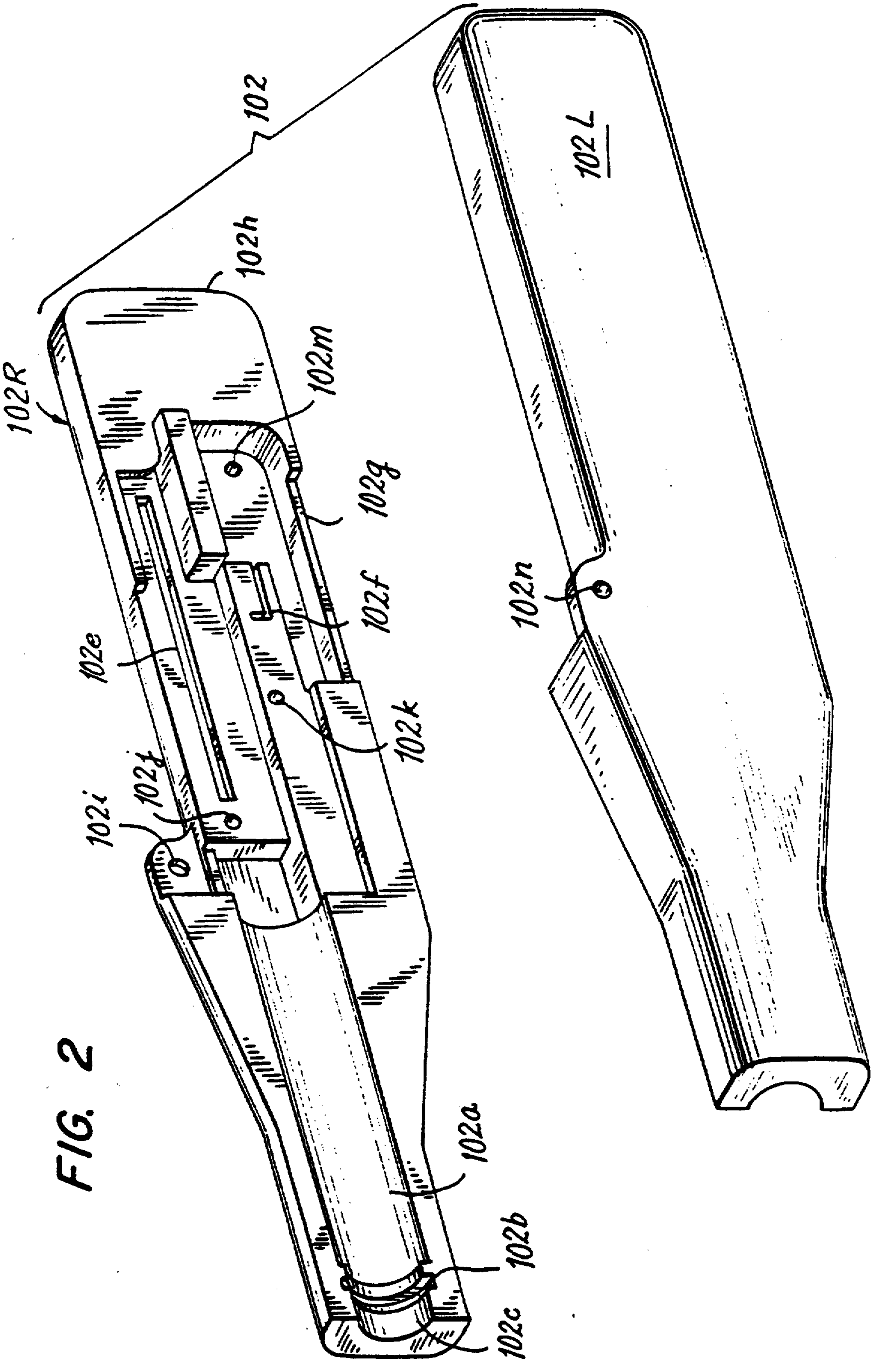
FIG. 2 illustrates a perspective view of the frame portions of the embodiment of FIG. 1.
Figure 3:
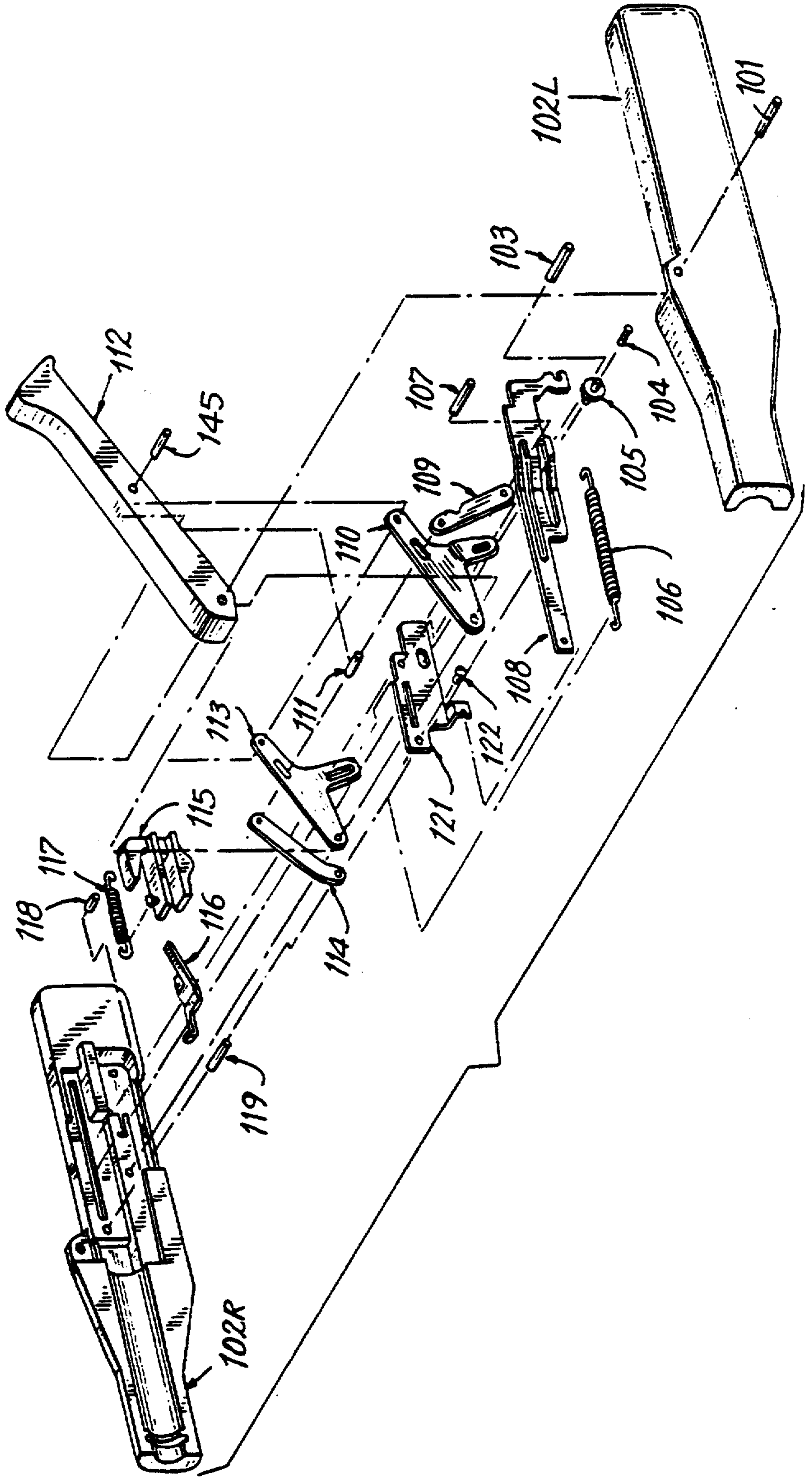
FIG. 3 illustrates an exploded perspective view of the actuating mechanism of the embodiment of FIG. 1.

More particularly, referring now to FIGS. 1 and 2, frame 102 comprises a left portion 102L and a right portion 102R. These portions are optimally fastened together by means of fastening screws, although rivets, welds, adhesives, or other means of joining the frame portions may be used. Frame 102 is elongated and has an interior surface defining a distal opening 102c, a proximal end 102h, an interior distal chamber 102a, a circumferential groove 102b, an upper guideway 102e to receive pins 107 and 103 (see below), a mounting slot 102f (to receive spring 116), elongated access aperture 102g, and pin mounting holes 102i, j, k, m and n for receiving pins 101, 119, 105, 118 and 101, respectively. The frame is of overall size and shape convenient for being held in the hand.

Referring additionally now to FIGS. 3, 4, 5, 6, 7 and 8, handle 112 is pivotally mounted to the frame 102 by means of handle pin 101 which is disposed through holes 102n and 102i in the frame, and hole 112b in the distal portion of the handle 112. Handle 112 also has an elongated cavity 112a for receiving the toggle levers 110 and 113. Hole 112c receives lever pin 145. Handle 112 serves as a means to activate the instrument when said handle is pivoted clockwise by the user of the instrument.

Toggle levers 113 and 110 are T-shaped levers which are pivotally mounted to the handle 112. Lever 113 has a proximal aperture 113b for receiving pin 145, a distal aperture 113d for receiving pin 101, said pins being respectively disposed through holes 112c and 112b in the handle 112. Lever 113 also has an elongated slot 113a for receiving pin 111, and a lower slot 113c for receiving pin 103.

Toggle lever 110 is similar to toggle lever 113 except that the lower portion is offset to the left by bend 110e. Slot 110c in the lower portion is for receiving pin 103. Slot 110a in the upper portion receives pin 111, and apertures 110b and 110d receive pins 145 and 101, respectively. The lower legs of the toggle levers 113 and 110 transmit motion of handle 112 to the rear channel 121 via pin 103.

Pusher bar rear link 109 is a flat elongated piece having an aperture 109a for receiving pin 111, an aperture 109b for receiving pin 107, and a curved notch 109c for accommodating pin 145 when the handle 112 is pushed down into a closed position. Pusher bar rear link 109 transfers movement from the handle 112 to the rear pusher bar 108.

Pusher bar front link 114 is an elongated flat piece having a bend 114c, aperture 114a for receiving pin 111, and aperture 114b for receiving pin 119.

Figure 15:
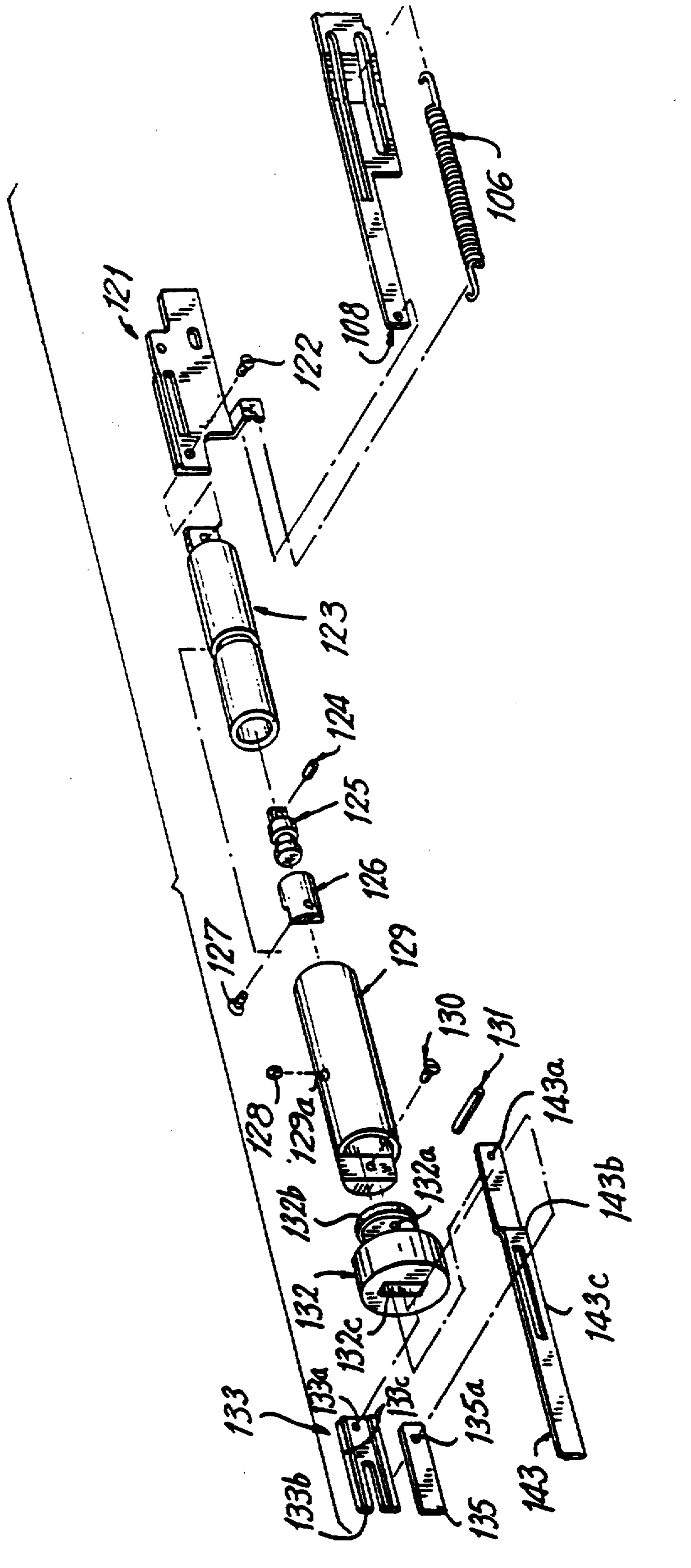
FIG. 15 illustrates an exploded perspective view of the transmission mechanism of the present invention.

Referring additionally now to FIGS. 9 and 10, rear channel 121 is longitudinally movable and has a distal aperture 121a to receive screw 122 for attachment to the rear channel tube 123 (see FIG. 15.). Rear channel 121 also has a proximal aperture 121b to receive pin 103. Slot 121g receives pin 119 and aperture 121c receives channel lock pin 105. Rear channel 121 has an overhang 121d, and a lower offset flap 121e with notch 121f for holding the distal end of spring 106. Rear channel 121 receives pivotal movement from toggle levers 110 and 113, and transfers motion linearly to the rear channel tube 123.

Rear pusher bar 108 is longitudinally movable and has a distal aperture 108a to receive pin 124 for mounting the distal end to the rear pusher bar tube 125 (see below). Rear pusher bar 108 also comprises upper slot 108b for receiving pin 119, lower slot 108d for receiving the channel lock pin 105, camming surface 108c, and offset flap 108 e with proximal notch 108f for receiving the proximal end of spring 106. Rear pusher bar 108 further possesses a stopping edge 108g which provides a catch means for engaging the locking flap of the pusher bar stop spring 116 (see below). Rear pusher bar 108 provides means for transferring pivotal movement from link 109 linearly to rear pusher bar tube 125.

Figure 11:
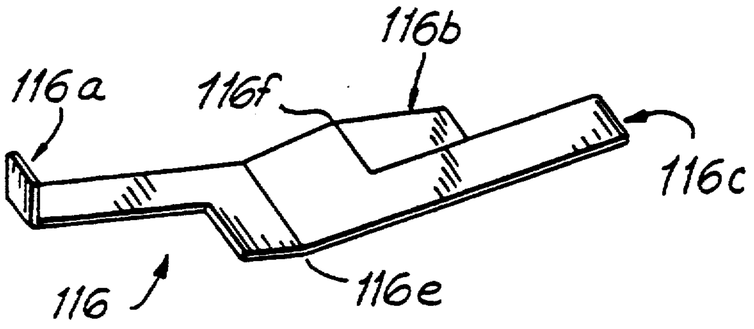
FIG. 11 illustrates a perspective view of the pusher bar stop spring.
Figure 12:
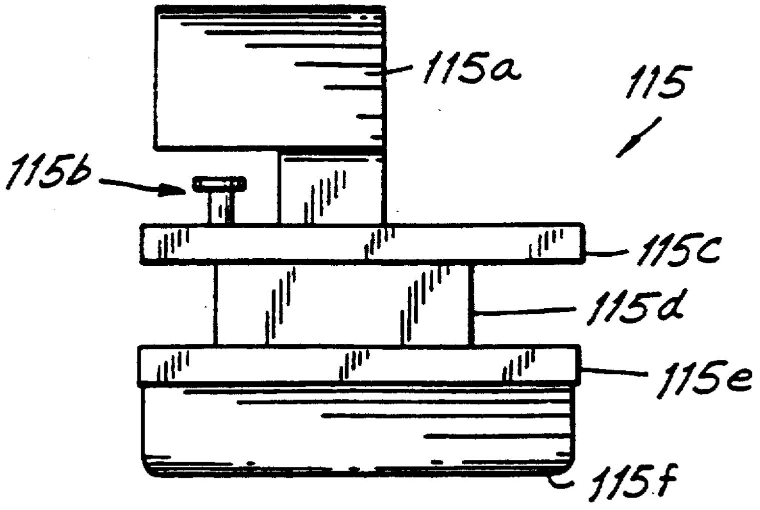
FIG. 12 illustrates a front view of the pusher slide.

Referring additionally now to FIGS. 11 and 12, resilient stop spring 116 has an elongated distal end with flap 116a for mounting into slot 102f in the right frame 102R. Spring 116 has a bend 116e, and a proximal end divided into a pusher bar stop latch 116c which provides means for locking the rear pusher bar 108 and a camming surface 116b which is angled by bend 116f, as illustrated. Slide member 115 has a cam member 115a, an anchor post 115b for engaging the distal hook end of spring 117, an upper base 115c, a connecting portion 115d, a lower base, 115e, and a curved pushing surface 115f. Slide member 115 rides along the longitudinal access aperture 102g and is mounted in the frame 102 such that the upper base is in the enclosed interior space of the frame 102, and the lower base 115e and pushing surface 115f project outside of the frame. The cam member 115a is engageable with the camming surface 116b of the spring 116. Upon moving distally the cam member 115a pushes spring 116 downward, thereby pivoting the stop latch 116c into a non-engageable position below the stopping edge 108g of the rear pusher 108.

Spring 117 is connected by a distal hook to the anchor post 115b and by a proximal hook to the pin 118, which is received into aperture 102m in right frame portion 102R.

Figure 13B:
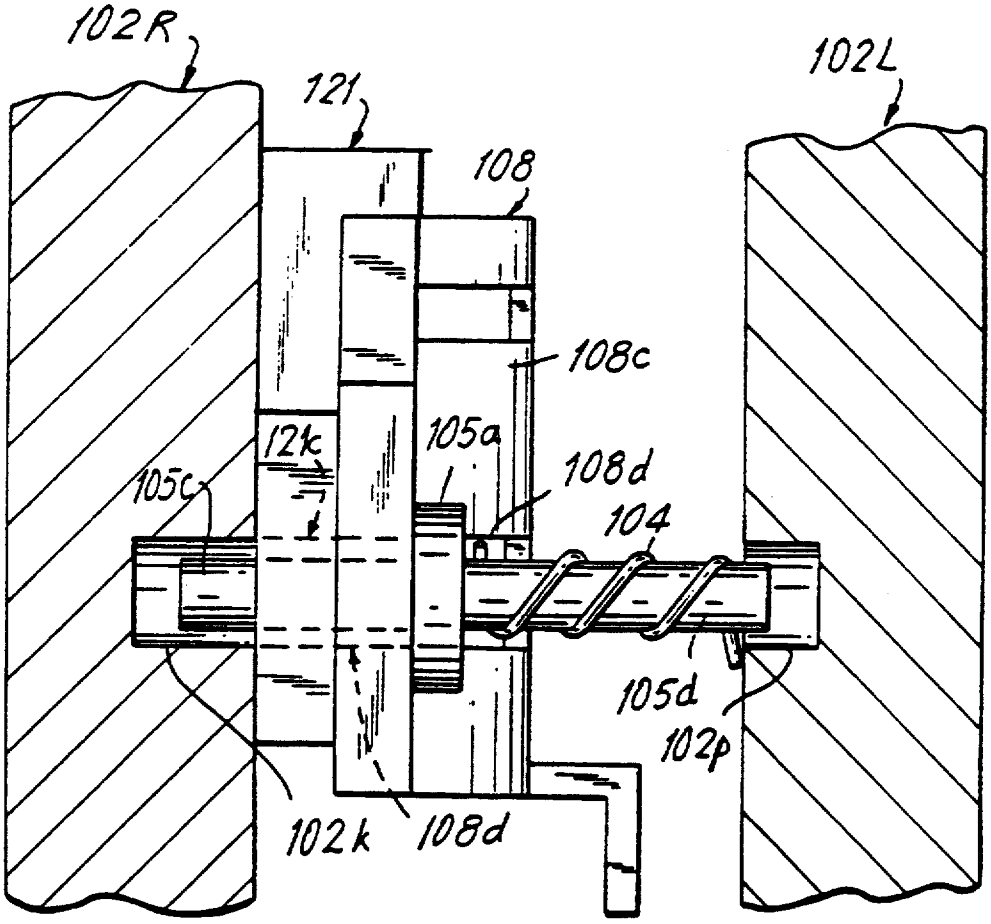

Referring additionally now to FIGS. 13a, 13b and 14, channel lock pin 105 provides means for locking the rear channel 121 and comprises a cylindrical portion 105a with camming surface 105b, and an axial shaft portion having ends 105c and 105d. When in the non-locking position channel lock pin 105 is located as illustrated in FIG. 13a. End 105d of the shaft is disposed axially through spring 104 and into hole 102p in the left frame portion 102L. End 105c is disposed through slot 108d of the rear pusher bar 108. When channel 105 is in the locking position as shown in FIG. 13b end 105c is disposed through aperture 121c in the rear channel 121, and hole 102k in the right frame portion 102R.

FIG. 15 illustrates the first transmission means (for transmitting linear movement to the clip advancing means) comprising the rear pusher bar 108, rear pusher bar tube 125, and front pusher bar tube 126, and the second transmission means comprising the rear channel 121, rear channel tube 123, and front channel tube 129. The rear channel 121 is connected to rear channel tube 123 by means of screw 122 disposed through aperture 121*a*. As can be seen additionally from FIG. 16, rear channel tube 123 has a proximal projection 123*b* having an aperture 123*a* for receiving screw 122. Rear channel tube 123 provides means for transferring linear movement from the rear channel 121 to the front channel tube 129 and is generally cylindrical in shape having a hollow bore and an external circumferential notch 123*c* for enabling the front channel tube to rotate.

Rear channel tube 123 is slidably mounted within the bore of front channel tube 129 which provides means for transferring linear motion from rear channel tube 123 to the front channel 133. Front channel tube 129 has a distal projection 129*b* having an aperture 129*a* for receiving screw 130 which is the mounting means for the front channel 133. Front channel tube is slidably mounted within the distal cylindrical chamber 102*a* of frame 102. Aperture 129*a* in the front channel tube 129 receives pin 128 which projects into groove 123*c* in the rear channel tube 123.

Rear pusher bar 108 is connected to the proximal projection 125*b* of the rear pusher bar tube 125 by means of pin 124 disposed through apertures 108*a* in the rear pusher bar 108 and 125*a* in the rear pusher bar tube 125. Rear pusher bar tube 125 provides means for transferring linear movement from the rear pusher bar 108 to the front pusher bar tube 126 while permitting the front pusher bar tube 126 to rotate. Rear pusher bar tube 125 is generally of cylindrical shape and has an external circumferential notch 125*c* for engaging proximal thrust collar 126*b* in the front pusher bar tube 126. Front pusher bar tube 126 has a distal projection 126*c* having an aperture 126*a* for receiving screw 127. Screw 127 is for mounting the proximal end of front pusher bar 143 and is disposed through aperture 143*a* in the front pusher bar.

Front pusher bar tube 126 transfers linear movement to pusher bar 143 from rear pusher bar tube 125. Cooperating thrust collar 126*b* and cylindrical notch 125*c* provide means for allowing rotation of front pusher bar tube 126 relative to rear pusher bar tube 125.

Rear pusher bar 108, rear pusher bar tube 125, front pusher bar tube 126, rear channel 121, front channel tube 129, and rear, channel tube 123 are all slidable in the longitudinal direction. When the instrument 100 is actuated rear pusher bar 108, pusher bar tube 125 and front pusher bar tube 126 move proximally as indicated by arrow "P", and the rear channel 121, rear channel tube 123, and front channel tube 129 move distally as indicated by arrow "D". In addition to longitudinal movement, front pusher bar tube 126 and front channel tube 129 are rotatable around the instrument axis.

Figure 17:
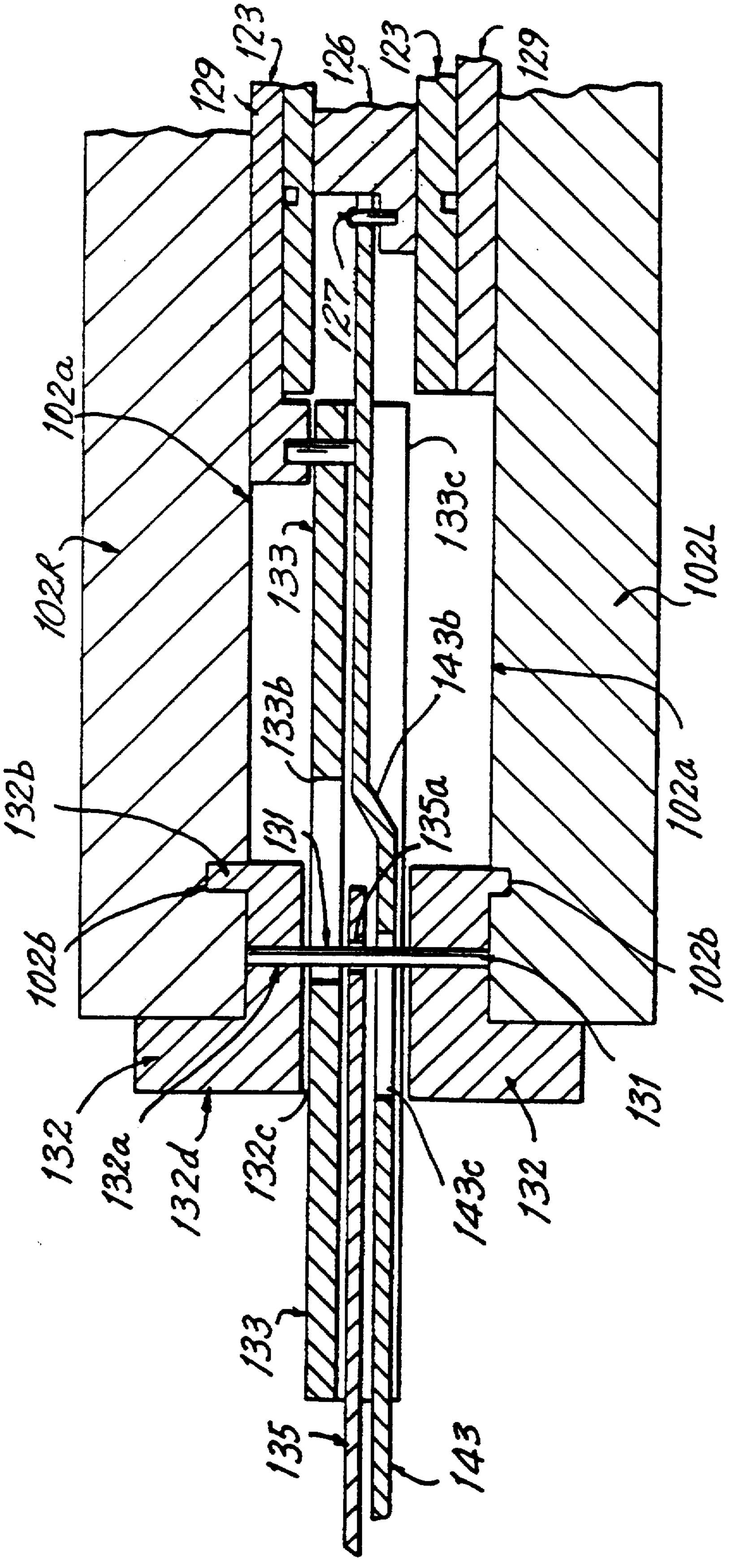
FIG. 17 illustrates a sectional top view of the collar fitting.

Referring additionally now to FIG. 17, collar 132 is generally cylindrical in shape having a radial aperture 132*a*, for receiving pin 131; a circumferential detent 132*b* for mounting into circumferential groove 102*b* in the frame; a rectangular slot 132*c* for receiving front channel 133, jaw blade 135, and front pusher bar 143; and a distal portion 132*d* which is located exterior to the frame. Collar 132 is rotatable but does not move longitudinally. The proximal end of front channel 133 is mounted to the front channel tube 129 by means of screw 130 disposed through apertures 133*a* and 129*a*. Front channel 133 has a slot 133*b* to allow longitudinal movement without interference from pin 131. When the instrument 100 is actuated, by pressing handle 112, front channel 133 moves distally. Slot 133*b* must therefore extend longitudinal for a distance sufficient to permit full distal movement of the front channel 133.

Front channel 133, which provides means for closing Jaws 135*b*, also has upper and lower guide rails 133*c* which project transversely from the top and bottom of front channel 133, and which extend longitudinally. Guide rails 133*c* serve as means to retain and align front pusher bar 143 and jaw blade 135 as well as means to close jaws 135*b*.

Front pusher bar 143 is connected to the front pusher bar tube 126 by means of screw 127 disposed through apertures 143*a* and 126*a*. Front pusher bar 143 has a bend 143*b* to widen the distance between it and the front channel 133 so as to accommodate jaw blade 135 disposed therebetween. Front pusher bar 143 has a slot 143*c* to allow longitudinal movement without interference from pin 131. When the instrument is actuated by pressing handle 112, front pusher bar 133 moves proximally. Slot 143*c* must therefore extend longitudinally for a distance sufficient to permit full proximal movement of the front pusher bar 143.

Jaw blade 135 has an aperture 135*a* for receiving pin 131 and has a proximal end disposed within cylindrical collar 132. Jaw blade 135 provides clip closing means.

Figure 16:
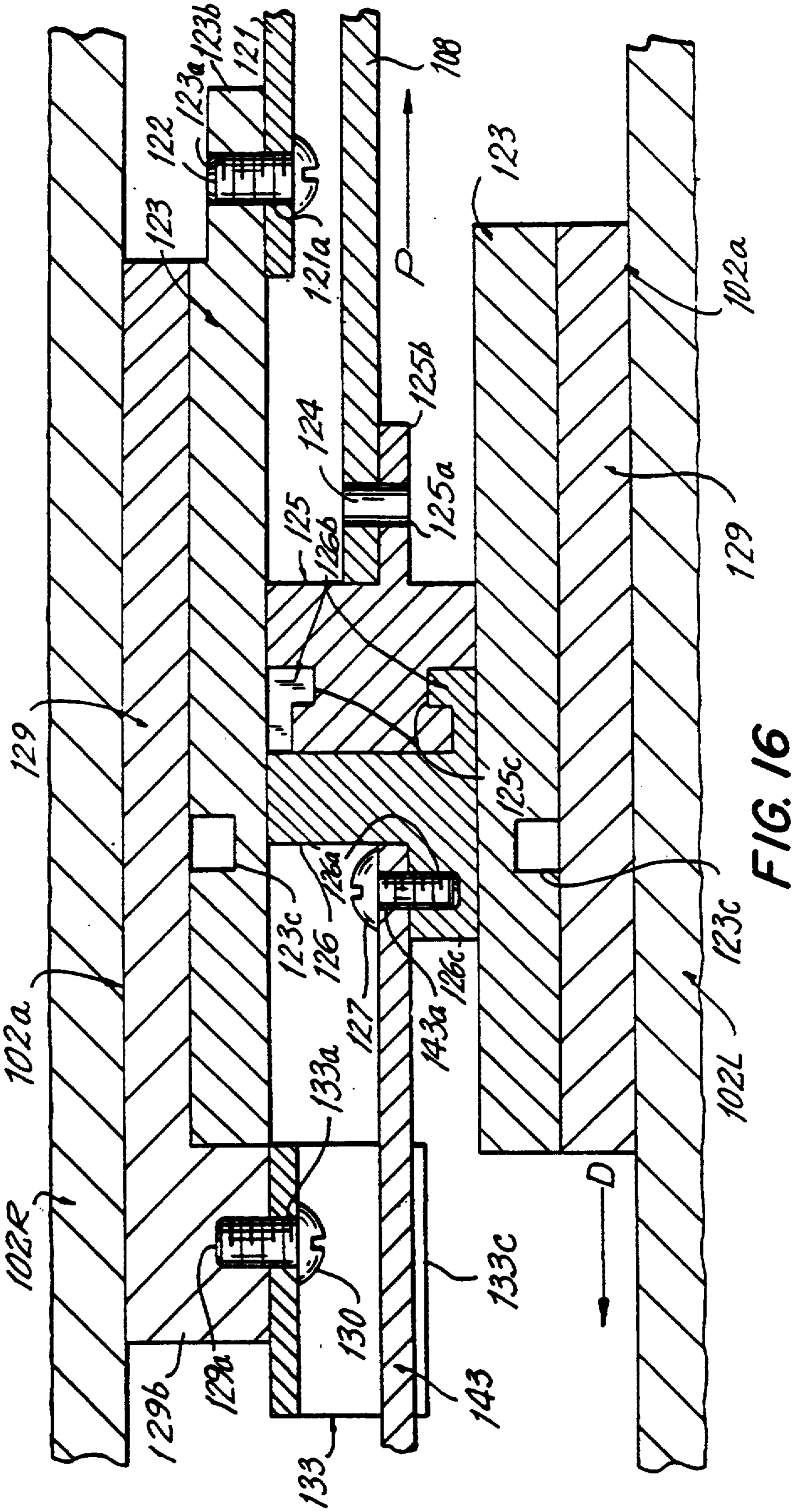
FIG. 16 illustrates a sectional top view of the transmission coupling.

As can be seen from FIGS. 15, 16 and 17, when collar 132 is rotated for example by manually turning the distal portion 132*d*, jaw blade 135, front channel 133, and front pusher bar 143 are likewise rotated, as well as front tube channel 129 and front pusher bar tube 126. Unlike front pusher bar 143 and front channel 133, jaw blade 135 does not also move longitudinally.

Figure 18:
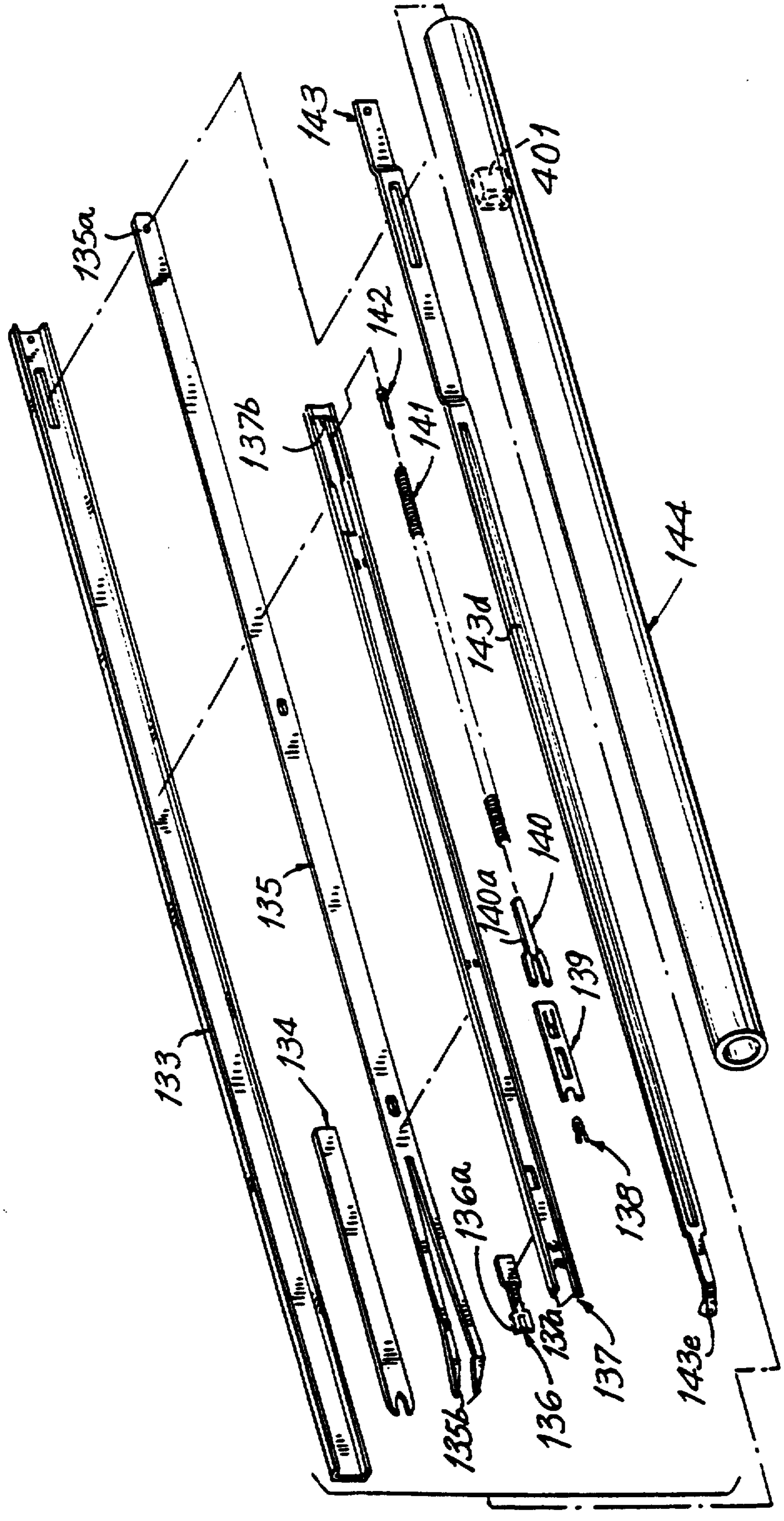
FIG. 18 illustrates an exploded perspective view of the endoscopic portion of the instrument.

Referring now to FIG. 18, the endoscopic portion of the instrument comprises a cover tube 144 enclosing front pusher bar 143, spring anchor shaft 142, spring 141, rear pusher clip 140, front pusher clip 139, (optional) clips 138, clip carrier 137, safety stop 136, jaw blade 135, tissue stop 134, front channel 133, and sealing block 401.

Cover 144 is an elongated tube fixed at its proximal end to collar 132. Front pusher bar 143 is an elongated piece longitudinally disposed within cover 144. In addition to features discussed above, front pusher bar 143 comprises an elongated longitudinal slot 143*d*, and inclined pusher tip 143*e*. Carrier 137 is longitudinally positioned along the side of pusher 143 and provides a means for carrying surgical clips 138 which are disposed within the longitudinal guide rail 137*a*. At its proximal end carrier 137 has a mounting post 137*b* for spring anchor shaft 142. The proximal end of spring 141 is mounted on anchor shaft 142, and the distal end of spring 141 is mounted to the proximal end of rear pusher clip 140. Rear pusher clip 140 has a bar 140*a* which rides in slot 143*d* of the front pusher bar. The distal end of the rear pusher clip 140 contacts the proximal end of the front pusher clip 139, which engages and pushes the clips 138 distally.

Safety stop 136 is an escapement with prong members 136*a* which project into the path of the clips 138 to limit the distal loading of the clips to one clip at a time. Safety stop 136 is attached to the distal end of carrier 137.

Jaw blade 135 is disposed within the front channel 133 and has a pronged distal end with jaws 135*b* which are flexibly movable toward each other. When the instrument is actuated the jaws are forced together by the camming action of the guide rails 133*c* of the distally moving front channel 133. Tissue stop 134, which is fixed to the side of the jaw blade 135 prevents the blood vessel or other tissue from proximally moving beyond the jaws 135*b*.

FIGS. 19*a* and 19*b* illustrate a clip located between jaws 135*b*. Grooves 135*c* facilitate the proper alignment and positioning of the clip. Jaws 135*b* also have camming surfaces 135*d* which are contacted by the distally moving guide rails 133*c* thereby forcing the jaws (and the clip 138) into closed position. The jaws blade 135 does not move longitudinally.

When handle 112 is pressed, it pivots clockwise thereby pivoting levers 110 and 113, and link 109 (which pivots counterclockwise) and link 114 (which pivots clockwise). Link 109 pushes the rear pusher bar 108 longitudinally in the proximal direction, and link 114 pushes the rear channel 121 longitudinally in the distal direction. Rear pusher bar 108 pulls the front pusher bar in the proximal direction via rear and front pusher bar tubes 125 and 126 respectively. The front and rear pusher bar tubes 126 and 125 are coupled so as to permit rotation of the front pusher bar tube 126 relative to the rear pusher bar tube 125. The rear channel 121 pushes channel 133 distally via rear channel tube 123 and front channel tube 129. The front and rear channel tubes 129 and 123 are coupled so as to permit rotation of the front channel tube 129 relative to thee rear channel tube 123. When channel 133 advances distally, it cams the jaws of jaw blade 135 into the closed position, thereby closing a surgical clip.

As the rear pusher bar 108 is being pushed proximally to the rear of the instrument, offset flap 108*e* rides over the stop latch portion 116*c* of spring 116, and when the offset flap passes proximally beyond the latch 116*c*, said latch 116*c* then springs upward and engages edge 108*g* of the rear pusher bar 108. The pusher bar is then locked and prevented from going distally forward. Furthermore, when the rear pusher bar is moved to a proximal position, channel lock pin is permitted to extend further towards 102R. When the handle 112 is subsequently released, the rear channel 121 is allowed to return proximally to its original prefiring position. When it does so, aperture 121*c* becomes aligned with aperture 102*k* in the right frame 102R, and the lock pin slides therethrough, locking the actuating mechanism so that the handle cannot be pressed again. The reason for this safety locking mechanism is that, having already closed a clip 138, jaws 135*b* are not yet chambered with another clip. As a precautionary measure, lock pin 105 prevents the operating surgeon from mistakenly closing the jaws when they are empty.

To release the lock mechanism, the surgeon pushes the exposed pushing surface 115*f* of the slide member 115 forward in the distal direction. Cam member 115*a* then presses down the camming surface 116*b* of spring 116. This pushes down latch 116 and disengages the rear pusher bar 108, which slides forward. When rear pusher bar 108 slides forward the inclined camming surface 108*c* wedges the lock pin 105 out of engagement with apertures 102*k* and 121*c*, thereby unlocking the actuation mechanism, Furthermore, as rear pusher bar 108 springs forward the front pusher bar 143 also moves forward and pushes another clip 138 into position between jaws 135*b*. The instrument 100 may then be reactuated to apply another clip.

A feature of this invention is that the transmission system transmits linear, longitudinal motion to the endoscopic portion of the instrument, while allowing the endoscopic portion of the instrument to rotate relative to the frame and actuating mechanism. This is accomplished by means of the couplings between front and rear pusher bar tubes 126 and 125, between front channel tube and rear channel tube 129 and 123, and between the collar 132 and the frame 102.

In the above described embodiment the endoscopic portion is not detachable. However, an alternative embodiment of the present invention comprises a disposable and replaceable endoscopic portion which is detachable from a reusable frame.

Figure 20:
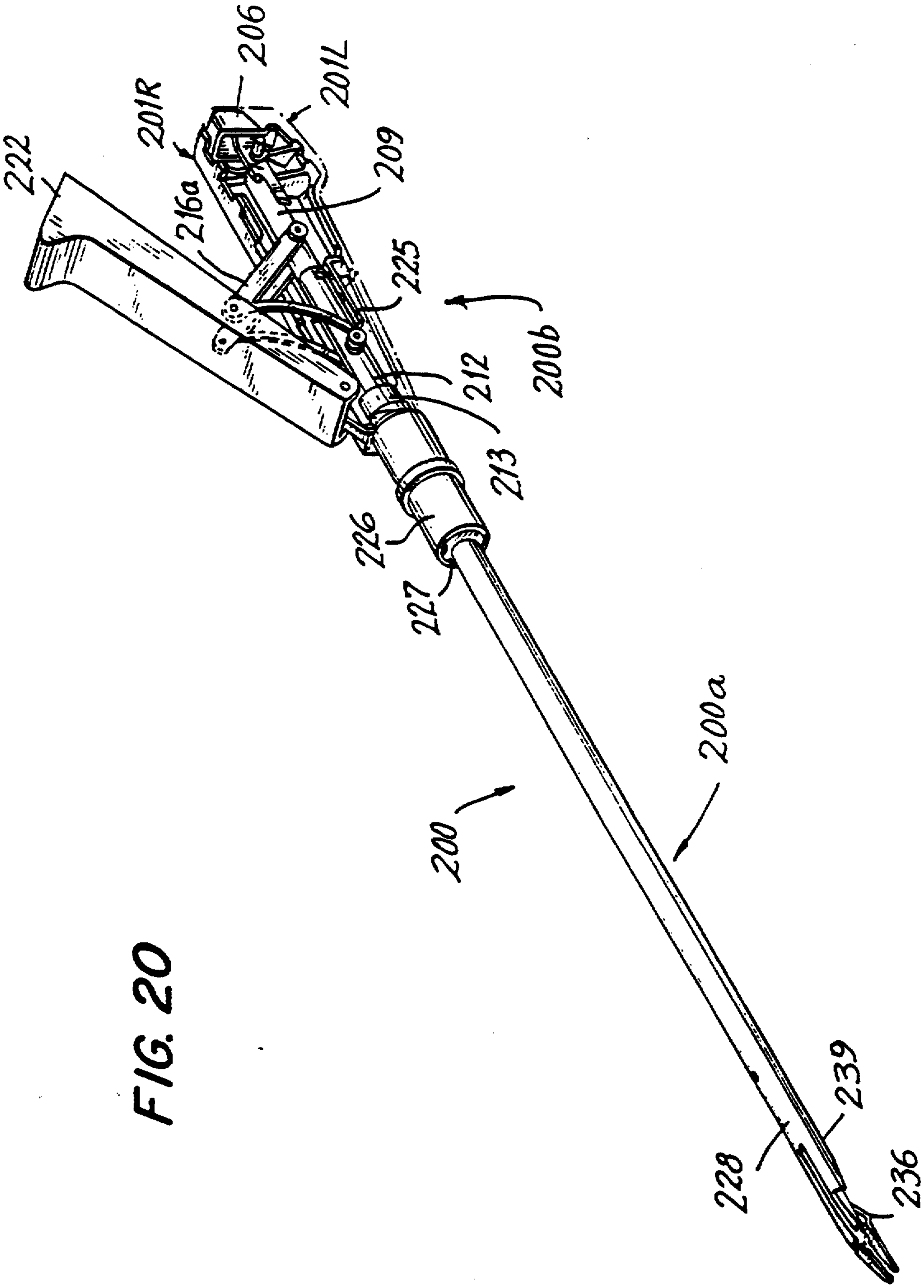
FIG. 20 illustrates a cutaway perspective view of an alternative embodiment of the present invention.

FIG. 20 shows a cutaway perspective view of the alternative embodiment of the present invention 200 which generally comprises a reusable actuating body 200*b* supporting replaceable and disposable endoscopic portion 200*a*. Included are means for actuating the instrument, transmission means, means for applying a surgical clip to a blood vessel or the like, means for locking the instrument, and means for repositioning another clip and unlocking the mechanism.

Figure 21:
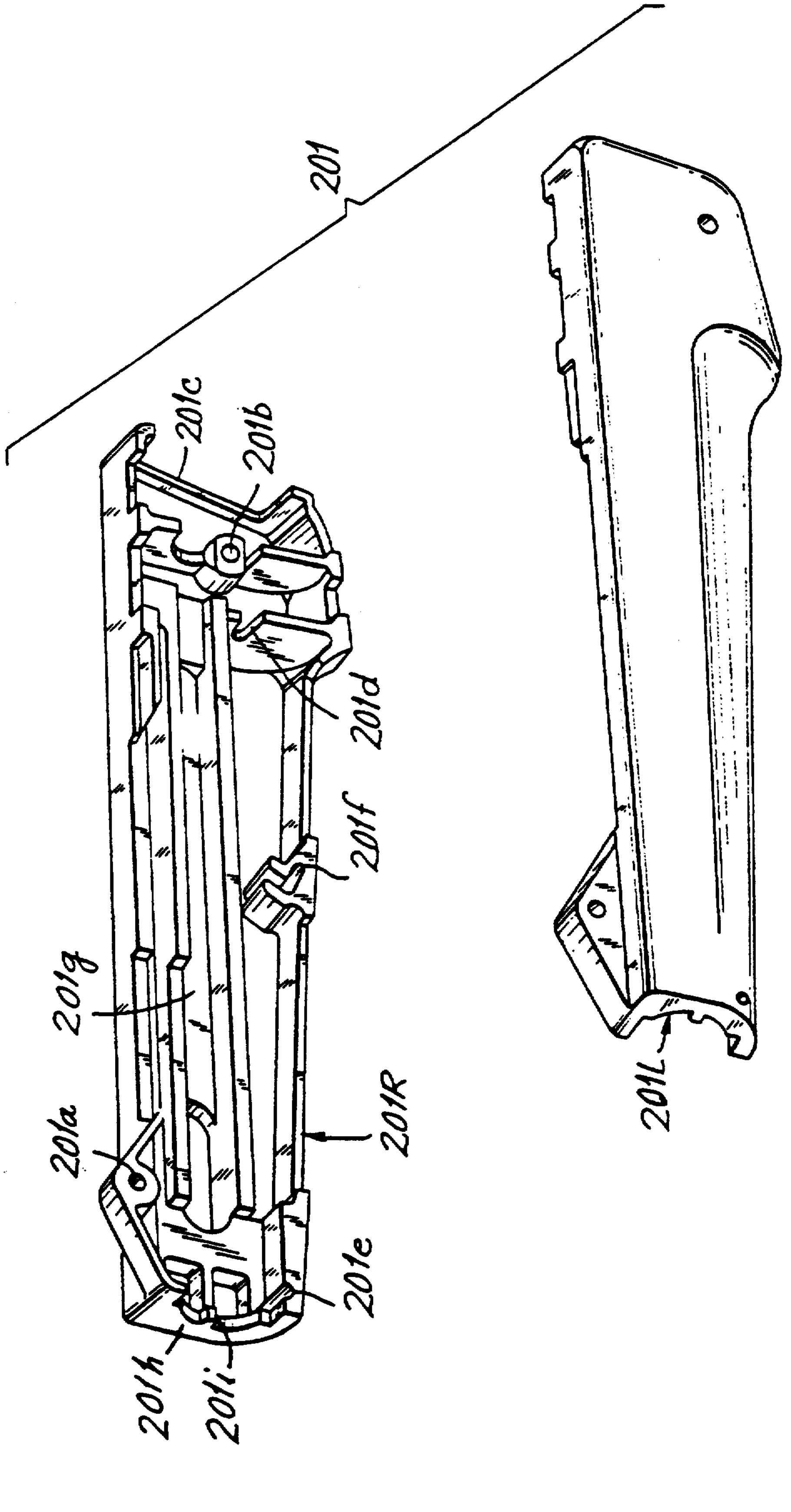
FIG. 21 illustrates the frame of an alternative embodiment.
Figure 22:
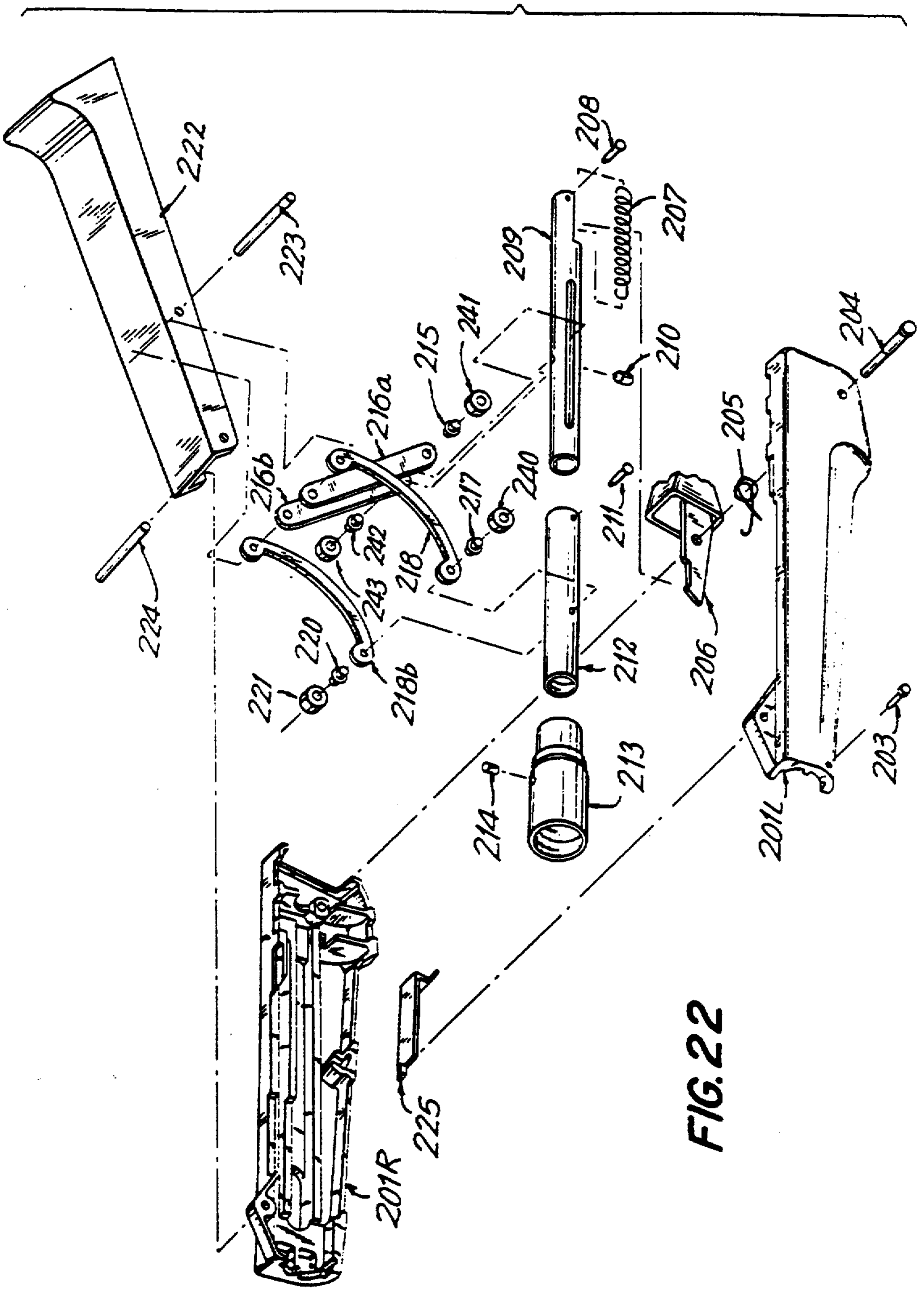
FIG. 22 illustrates an exploded perspective view of the actuating and transmission system of an alternative embodiment.
Figure 23:
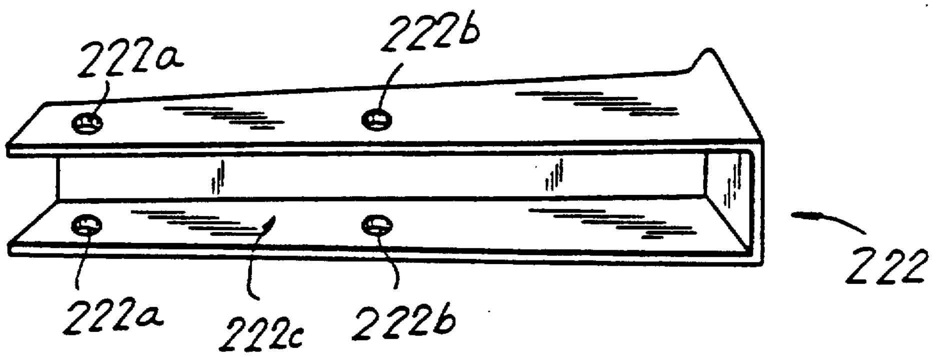
FIG. 23 illustrates the handle of an alternative embodiment.
Figure 24A:
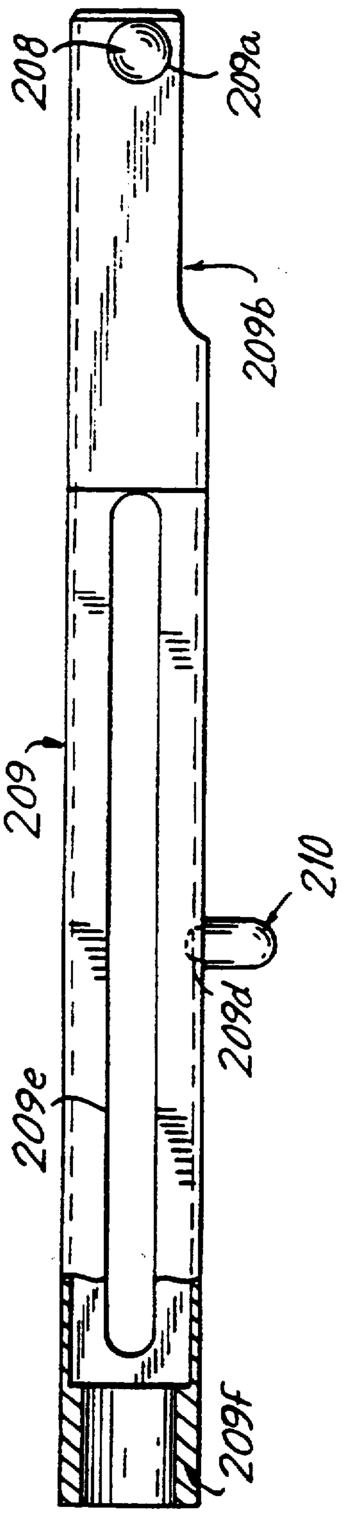
FIGS. 24*a* and 24*b* illustrate in sectional side view and bottom view respectively, the pusher tube of an alternative embodiment.
Figure 24B:
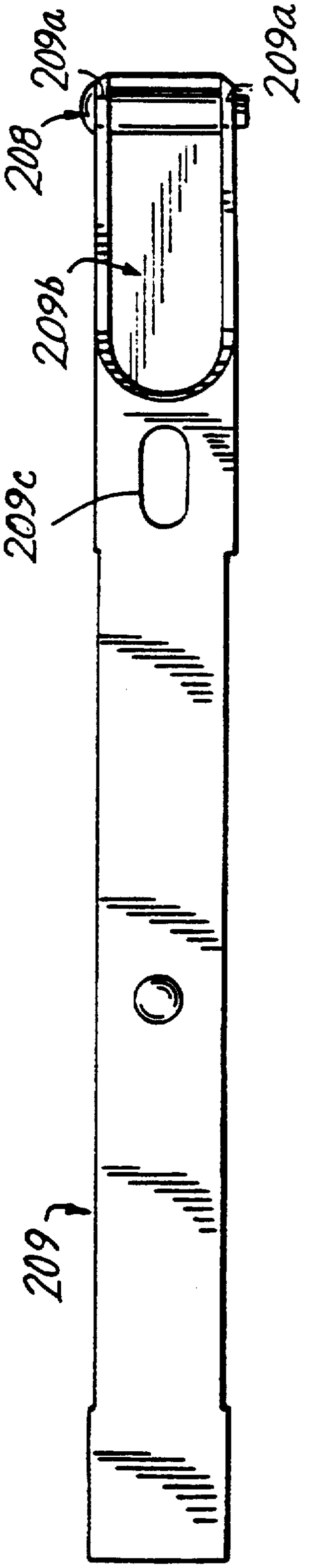
Figure 25A:
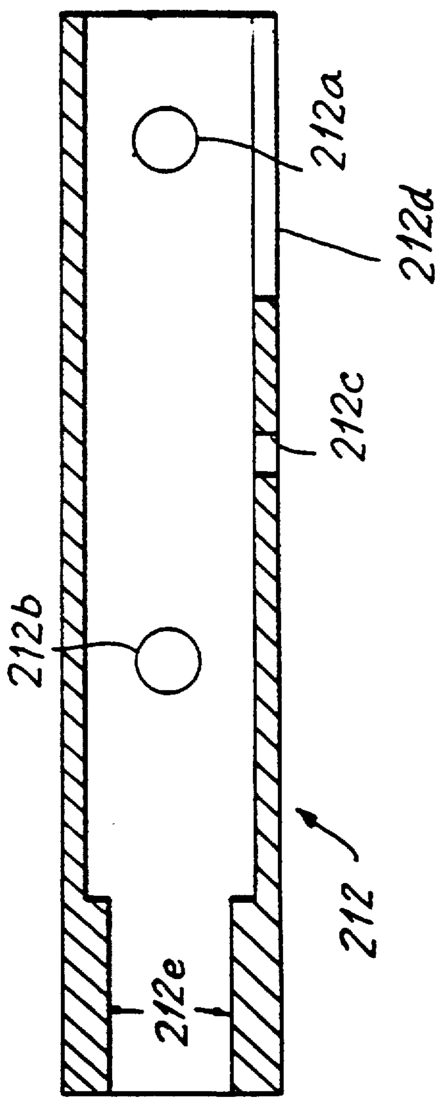

More particularly, referring to FIGS. 20, 21 and 22, frame 201 comprises a left frame portion 201L and right frame portion 201R. These portions may be either cast or machined pieces of polymeric resin or metal. The left and right portions may optionally be fastened together by means of fastening screws although rivets, welds, adhesives, or other means of joining the frame portions may be used. Frame 201 is elongated and is of overall size and shape convenient for being held in the hand. Frame 201 has an interior surface defining a distal opening 201*h*, a proximal opening 201*c*, an interior transmission guideway 201*g*, apertures 201*a* and 201*b* for receiving pins 224 and 204 respectively, backstop notch 201*d* for spring 205, bottom notch 201*e*, mounting notch for spring 225, and distal opening detents 201*i*.

Referring additionally to FIGS. 23, 24*a*, 24*b*, 25, 25*a*, 26 and 27, handle 222 is an elongated piece which is pivotably mounted to the distal end of frame 201 by means of pin 224 which is disposed through aperture 222*a* in the handle and 201*a* in the frame. Aperture 222*b* is adapted to receive link pivot pin 223. Elongated cavity 222*c* is adapted to receive pusher links 216 and 216*a*, and channel links 218 and 219.

Channel links 218*a* and 218*b* preferably are curved elongated pieces having upper apertures for receiving pin 223, and lower apertures for receiving pins 217 and 220 respectively. Channel links 218*a* and 218*b* provide means for transferring movement from the handle 222 to the channel tube 212, and act as a load limiter as well.

Pusher links 216*a* and 216*b* are elongated pieces having apertures for receiving pin 223 and apertures for receiving pins 215 and 242 respectively. Pusher links 216*a* and 216*b* provide means for transferring movement from the handle 222 to the pusher tube 209.

Pins 215, 217, 220 and 242 each comprise a disc like center portion, and two shafts projecting axially therefrom. The inwardly projecting shaft is adapted to be received into the respective aperture of the channel or pusher link, and the oppositely projecting shaft is adapted to be received into the axial bore of the respective roller bearings 241, 240, 221, and 243. The inwardly projecting shafts of pins 217 and 220 are received into apertures in the channel tube 212, whereas the inwardly projecting shafts of pins 215 and 242 are disposed through the side slots of the pusher tube 209.

The roller bearings 240, 221, 241, 243 are adapted to slide along the guideways 201*g* in frame 201.

Pusher tube 209 provides a first transmission means for transmitting linear movement to the pusher bar 229 and comprises an elongated tubular piece located within the transmission guideway 201*g*. At its proximal end pusher tube 209 has apertures 209*a* for receiving cross pin 208, and proximal terminal notch 209*b*. Pusher tube 209 also comprises a bottom slot 209*c* for engaging release button 206, an aperture 209*d* for receiving pusher tube camming pin 210, side slots 209*e* for receiving pins 215 and 242, and an interior circumferential projection 209*f* at the distal end of the pusher tube for engaging the proximal end of the pusher 229 (see below).

Channel tube 212 provides a second transmission means for transmitting linear movement to channel 238 and comprises a proximal aperture 212*a* for receiving pin 211, apertures 212*b* for receiving pins 217 and 220, bottom aperture 212*c* for engaging spring clip 225, and proximal slot 212*d* for receiving camming pin 210. Pusher tube 209 is slidably mounted within channel tube 212 and the two are biased into alignment by means of spring 207 which is axially disposed within pusher tube 209 and which is attached at its proximal end to pin 208 and at its distal end to pin 211. Channel tube 212 further has an interior circumferential projection 212*e* at the distal end of for engaging the proximal end of channel 233.

Leaf spring or spring clip 225 is a catch means for locking the channel tube in the proximal position after the instrument has been actuated. Spring clip 225 has a distal end with angled portion 225*a* for being mounted in notch 201*f* of the frame. At its distal end, resilient spring clip 225 has a catch 225*b* which is engageable with aperture 212*c* of the channel tube 212. Spring clip 225 has a camming surface 225*c* which is contacted by pusher tube camming pin 210 when the pusher tube moves in the distal direction, thereby depressing the spring clip 225 and disengaging and unlocking the channel tube 212.

Release button 206 is pivotally mounted at the proximal end of frame 201 by means of pivot pin 204 which is disposed through aperture 206*a* and 201*b*. Release button 206 has a proximal end 206*b* which projects through aperture 201*c* in the frame, and a catch 206*c* at its distal end for engaging aperture 209*c* of the pusher tube 209.

Figure 28:
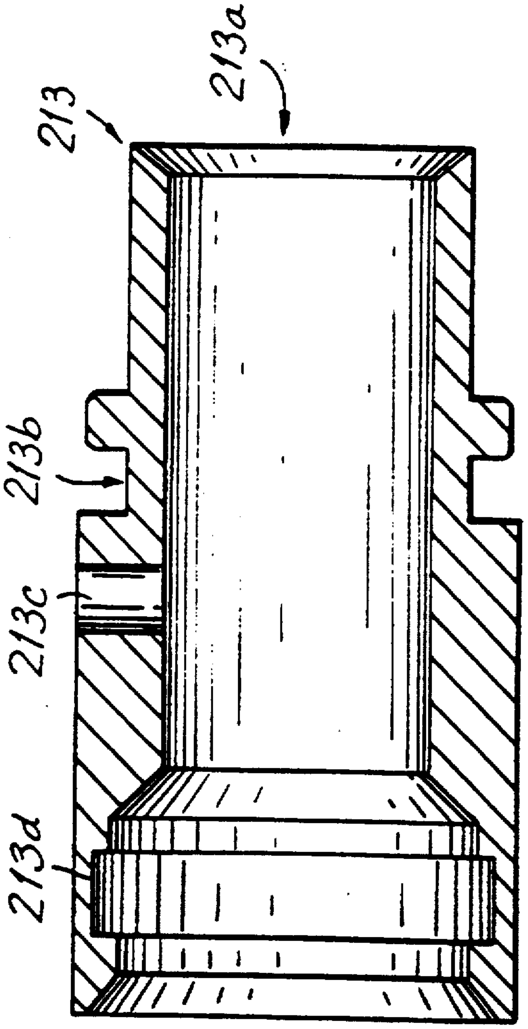
FIG. 28 illustrates a sectional side view of the outer tube of an alternative embodiment.

Referring additionally now to FIG. 28, outer tube 213 is adapted to be received into distal access opening 201*h* of the frame. Outer tube 213 has a proximal opening 213*a*, a circumferential outer notch 213*b* which is adapted to receive detent 201*i* in the distal opening of the frame, an aperture 213*c* for receiving pin 214, and a circumferential inner notch 213*d* at the distal end of the outer tube for engaging and interlocking with the collet 227.

Pin 214 is received into aperture 213*c* of the outer tube and projects a small distance beyond the outer surface thereof. It provides a contact surface to engage the interior notches of the sleeve 226 as discussed below.

The above described portion of the alternative embodiment is the reusable portion 200*b*. The replaceable endoscopic portion 200*a* described below is adapted to be received into the distal end of the reusable portion 200*b* and to project outwardly therefrom. The endoscopic portion 200*a* is rotatable relative to the reusable portion 200*b*.

Figure 29:
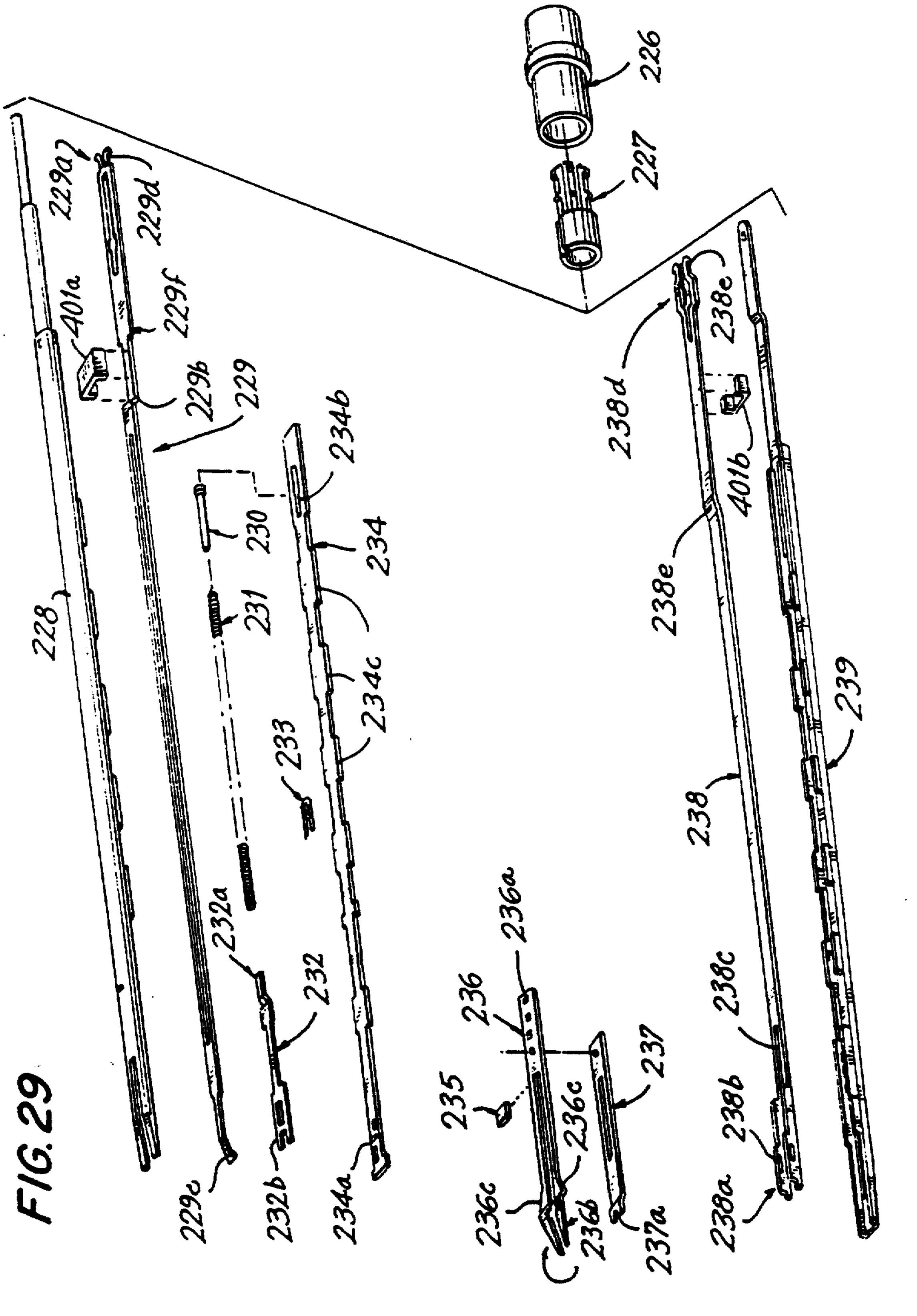
FIG. 29 illustrates in exploded view the endoscopic portion of an alternative embodiment.
Figure 30:
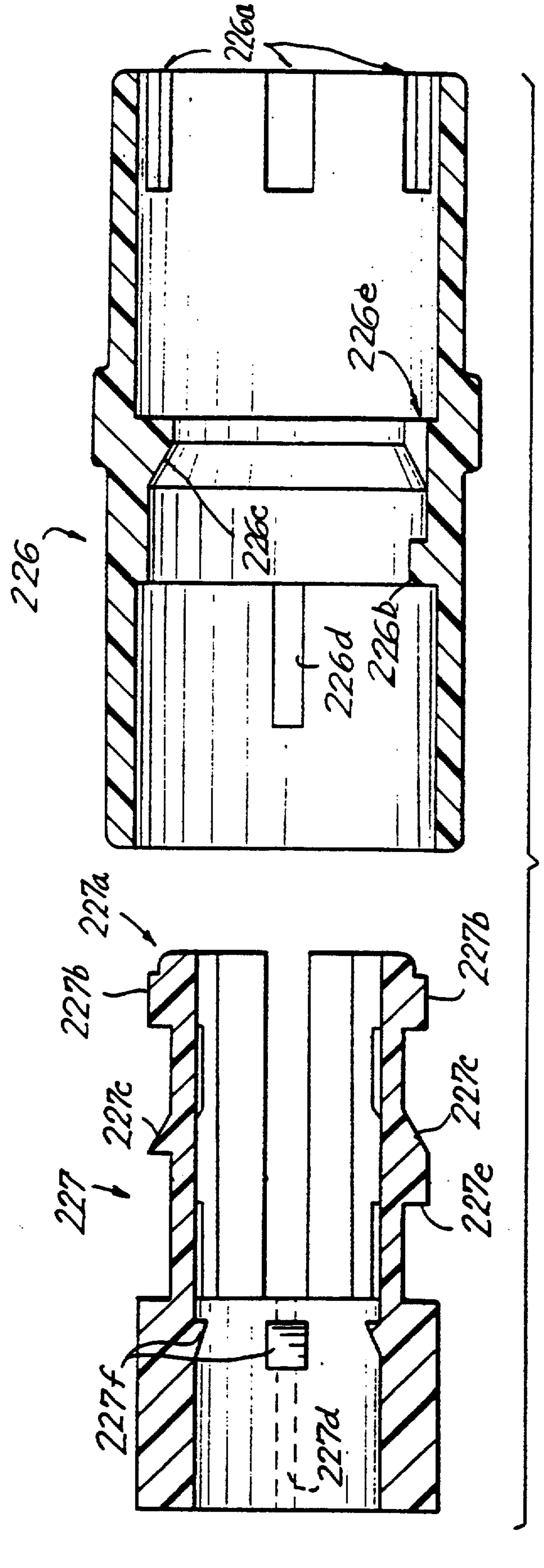
FIG. 30 illustrates a sectional top view of the collet and sleeve of an alternative embodiment.

Referring additionally now to FIGS. 29 and 30, the replaceable portion 200*a* includes a coupling which comprises sleeve 226 and collet 227. The coupling is adapted to connect the endoscopic portion to the non-endoscopic instrument body portion while permitting rotation of the endoscopic portion. Sleeve 226 is a tubular piece having several longitudinal notches 226*a* on the interior surface of the proximal end for engaging the protruding portion of pin 214. The pin 214 and notches 226*a* cooperate so as to form click-stop settings wherein the sleeve can rotate to any of several positions and be temporarily seated in the chosen position. Sleeve 226 has slot 226*e* and detent 226*b* which are adapted to cooperate with the collet 227 to retain the collet 227 within the sleeve 226 once the collet 227 has been inserted. Detent 226*b* serves as a backstop by abutting the distal surface of projection 227*e* in the collet. Key 226*d* on the inside surface of sleeve 226 is adapted to fit into longitudinal spline 227*d* in the outside surface of collet 227. Camming surface 226*c* is adapted to push against surface 227*c* in the outer surface of the collet 227.

The proximal portion of collet 227 comprises several proximally extending prongs 227*a*, each prong having on its outer surface a projection 227*b* for engaging and locking into circumferential notch 213*d* on the interior surface of the outer tube 213. Once inserted into sleeve 226, collet 227 locks into place by means of projecting surface 227*e* which abuts detent 226*b* in the sleeve. Projections 227*f* lock into cooperating notches in the cartridge halves 228, 229. When camming surfaces 227*c* on the exterior surface of the prongs 227*b* are contacted by camming surface 227*c* in the sleeve as for example when the sleeve 226 and collet 227 are pushed together, the prongs 227*b* are biased closer to the axial center of the collet 227, thereby enabling them to disengage from the outer tube.

The endoscopic portion is axially disposed through the collet and sleeve, and connects to the actuating and transmission mechanisms described above. As can be seen from FIG. 29, the endoscopic portion comprises upper and lower cartridge portions 228 and 239, and disposed within the cartridge portions are pusher bar 229, clip pusher 232, clip feed spring 231, spring anchor shaft 230, bottom clip track 234, capture plate 235, jaw blade 236, tissue stop 237, channel 238, clip 233 and sealing block 401.

Figure 31:
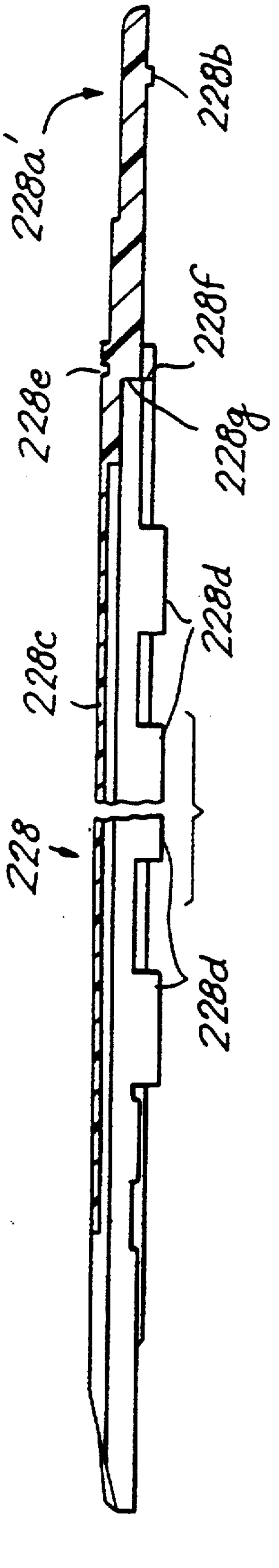
FIG. 31 illustrates a sectional side view of the upper portion of the cartridge of an alternative embodiment.
Figure 32:
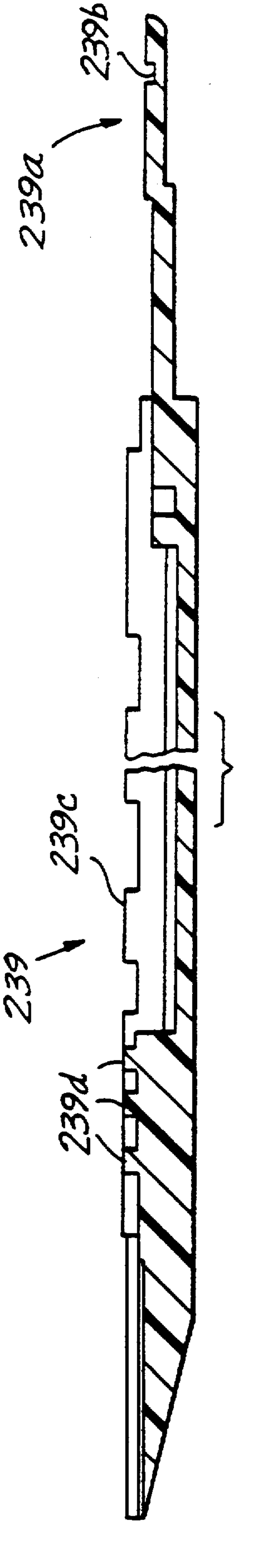
FIG. 32 illustrates a sectional side view of the lower portion of the cartridge of an alternative embodiment.

Referring additionally now to FIGS. 31 and 32, upper cartridge portion 228 comprises an elongated relatively small diameter piece which, in addition to lower cartridge portion 239, houses the endoscopic portion of the apparatus clip applying mechanisms. The cartridge may be constructed of polymeric material suitable for surgical procedures and has a width of about 0.3 inches for practical use in endoscopic or laparoscopic surgical procedures. Upper cartridge portion 228 comprises a proximal end 228*a* having a projection 228*b* for engaging corresponding notch 239*b* in the lower cartridge portion, notches 228*e* for engaging corresponding projections 227*f* in the collet, stopping surface 228*f* for limiting the distal or forward movement of the pusher bar 229 by engaging projections 229*f*, stopping surface 228*g* for limiting the rearward or proximal movement of the pusher bar 229 by engaging bend 229*b*, rectangular projections 228*d* for alternating alignment with projections 239*c* in the lower cartridge portion 239, and guide way 228c for aligning the pusher bar 229.

Lower cartridge portion 239 comprises a proximal portion 239a having a notch 239b for receiving projection 228b, projections 239c, and projections 239d for engaging the corresponding apertures in the jaw blade 236.

Channel 238 is an elongated piece having a distal end with camming portions 238a for contacting the jaws 236b and pushing them into a closed position. Slots 238b are for receiving capture plate 235. Channel 238 has an aperture 238c for receiving projections 239d of the bottom portion of the cartridge 239, bend 238e, and proximal prongs 238d having notches 238e for engaging projection 212e in the channel tube. Prongs 238 are resiliently flexible towards each other. Tissue stop 237 has a distal end 237a to protect the blood vessel or other tissue from entering too far between the jaws 236b.

Jaw blade 236 has a proximal end with apertures 236a for engaging projections 239d in the cartridge thereby aligning and firmly seating the jaw blade 236. Jaws 236b at the distal end have camming surfaces 236c which are contacted by the camming surfaces 238a of the channel. When the channel moves in the distal direction the jaw blades 236b are cammed into the closed position, thereby closing a clip positioned within said jaws.

Bottom track 234 for clips 233 is an elongated flat piece having a distal end with projections 234a which serve as an escapement means to limit the feeding of clips 233 to one clip at a time. Bottom track 234 has a mounting post 234b for the spring anchor 230, and flat side projections 234a for fitting and alignment in the cartridge 228.

Clip pusher 232 has a distal end with prongs 232b adapted to fit around any distally push clips 233 forward. Clip pusher 232a has a proximal post 232a for mounting spring 231.

Spring 231 is axially mounted at its proximal end to anchor 230, and at its distal end to clip pusher 232. Spring 231 resiliently moves the clip pusher forward in the distal direction.

Pusher bar 229c provides a means for advancing the clips into the jaws. Distal end 229c pushes the clips forward one at a time from track 234 to a position between the jaws.

Pusher bar 229 has a bend 229b which abuts stopping surface 228g to limit the proximal movement of he pusher bar, projections 229f which abut stopping surface 228f for limiting distal movement of the pusher bar 229, and a proximal end with resilient prongs 229a, each prong having a notch 229d for engaging projection 209f in the pusher tube. The resiliency of the prongs allow them to bend inward sufficiently to enable them to snap into place when the endoscopic portion of the instrument is inserted into the reusable body.

Figure 33A:
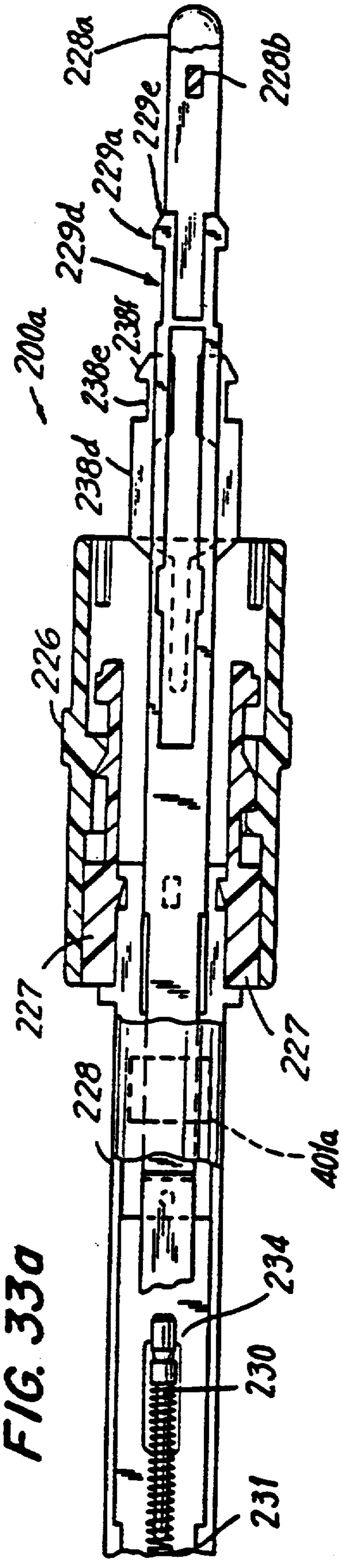
FIGS. 33*a* and 33*b* illustrate the proximal section of the endoscopic portion of an alternative embodiment.
Figure 33B:
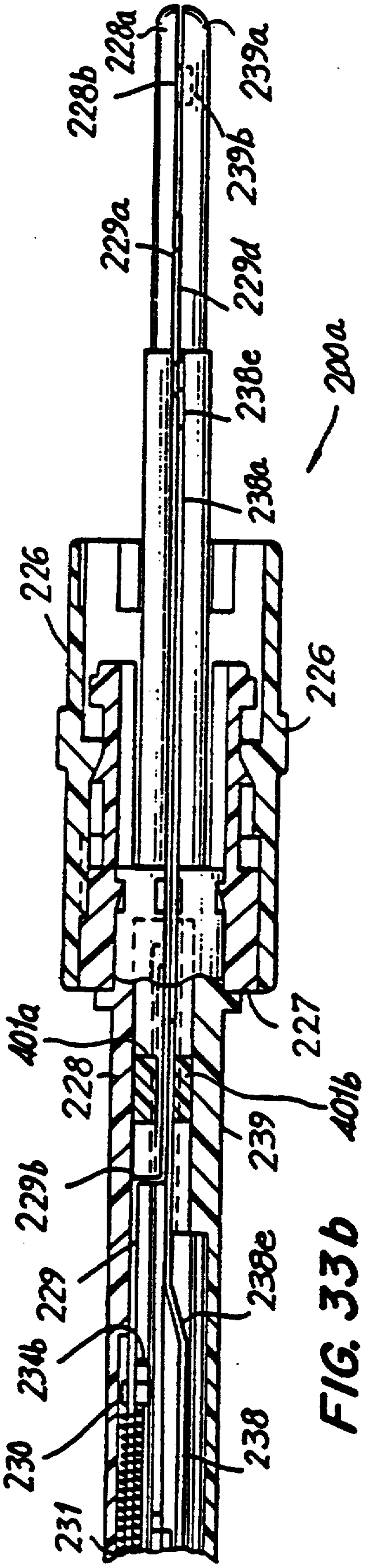

Referring additionally now to FIG. 33a, which shows a top sectional view of the proximal coupling end of the endoscopic portion 200a, and to FIG. 33b which shows the same portion in side view, the cartridge portions 228 and 239 which house the endoscopic portion of the apparatus, are disposed axially through the collet 227 and sleeve 226. As can be seen from the illustration pusher bar 229 and channel 238 are sandwiched between the cartridge portions, but have proximal ends 229a and 238d which, being slightly wider than the cartridge section 239a and 228a, protrude slightly from the sides. Inclined proximal edges of the pusher bar (229e) and the channel (238f) allow the respective prongs to be biased inward while the endoscopic portion 200a is being inserted into the reusable body 200b. The proximal portions 229a and 238a will then snap into place as channel tube projection 212e engages notches 238e and pusher tube projection 209f engages notches 229d, the prongs 229a and 238d thereupon resiliently expanding to their original position. The proximal movement of pusher tube 209 will draw the pusher bar 229 rearward in the proximal direction, and the distal movement of channel tube 212 will push the channel 238 forward.

Initially, the clip applier (both embodiments) is in the locked position, i.e., there is no clip loaded between the jaws. The jaws are biased open and are free to cam between the open and closed positions. This facilitates insertion of the endoscopic portion into an endoscopic tube or into the body since the jaws can cam partially closed, thereby avoiding interference with the positioning of the instrument.

When the clip applier has been properly positioned, the user may release the first and second transmission means from the locked position by pressing the release button (206). This disengages the first transmission means (pusher bar 209) which slides forward. The first transmission means comprises means to release the catch from the second transmission means. For example, in the first described embodiment the rear pusher bar has an inclined camming surface 108c to push aside channel lock pin 105 which locks the second transmission means. In the alternative embodiment pusher tube 209 (the first transmission means) has a depending pin 210 which, upon being carried forward, depresses leaf spring 225, thereby releasing the catch 225b from the channel tube 212 (second transmission means).

The first transmission means of both embodiments transfers motion to the pusher bar (143 and 229) which has a distal pusher end located behind the distal most clip in the array. When the pusher bar (i.e., the clip advancing means) moves forward the distal most clip is advanced to the jaws.

The second transmission means, upon being released, returns backward, thereby pulling the channel (133 in the first described embodiment; 238 in the alternative embodiment). The instrument is now ready to be actuated for clip application.

The endoscopic portion of the instrument 200a may be rotated relative to the reusable body 200b by manually turning sleeve 226.

As in the previously described first embodiment, the clip applier of the alternative embodiment is actuated by pressing the handle. When handle 201 is pressed pusher links 216a and 215b move pusher tube 209 proximally to the rear of the instrument thereby repositioning the pusher bar behind another clip, and channel links 218a and 218b move the channel tube 212 forward thereby causing the jaws to be closed for applying the surgical clip. The distally moving channel tube 212 pushes channel 233 forward, thereby camming the jaw blade 236 into a closed position for applying the surgical clip. The pusher tube 209 is locked in the proximal position when catch 206c of the release button 206 engages aperture 209c in the pusher tube. The channel tube 212 is locked in the proximal position when catch 225b of the leaf spring engages aperture 212c of the channel tube.

The instrument remains locked until the release button 206 is pressed, thereby unlocking the instrument as explained above.

Figure 34A:
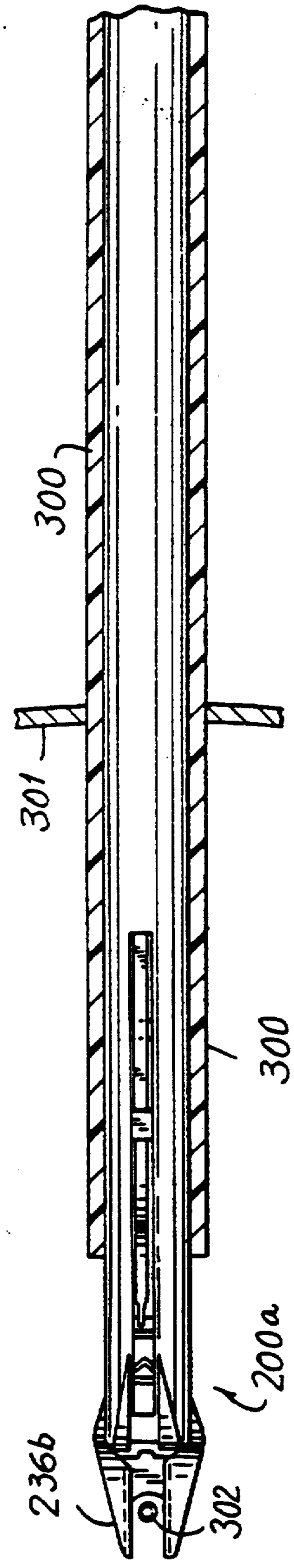
FIGS. 34*a* and 34*b* illustrate the endoscopic portion of the apparatus used in conjunction with the cannula of a trocar in top and side views, respectively.
Figure 34B:
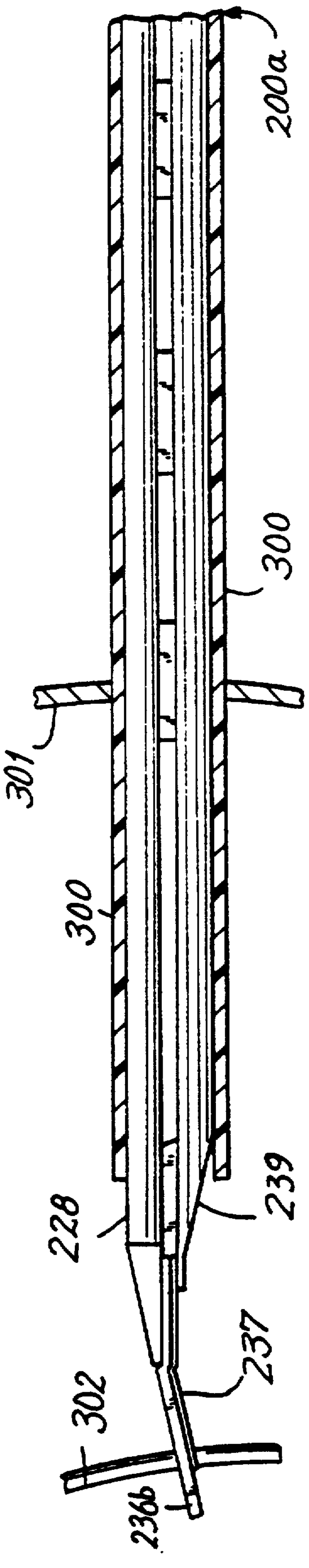

FIGS. 34a and 34b illustrate the apparatus of the present invention in conjunction with the cannula 300, or endoscopic guide tube, of a trocar to apply a surgical clip to blood vessel 302. (Trocars generally comprise a cutting tip, cannula, and valve means for sealing the cannula). The trocar is used to, penetrate the skin 301 of a patient and is inserted into the patient's body. Upon withdrawal of the cutting tip (not shown) of the trocar, the endoscopic portion of the apparatus 200a is inserted axially through the cannula 300 and maneuvered to the operating site where jaws 236b engage blood vessel 302. The endoscopic portion is in sealing engagement with the valve means to prevent entry or egress of gases.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. An apparatus for applying surgical clips to body tissue within a body cavity which comprises:
   a) a frame and at least one actuating member movably mounted with respect to said frame;
   b) an elongated endoscopic section having a proximal end, a distal end and a substantially circular cross-section, said endoscopic section connected at said proximal end to said frame and extending distally from said frame, said endoscopic section configured and adapted for insertion into an endoscopic tube which extends into the body cavity, said endoscopic section including:
      i) a clip track having a proximal end and a distal end;
      ii) a plurality of surgical clips aligned in an array and in contact with said clip track, said surgical clip array including a distal-most clip and defining a clip path;
      iii) a pair of flexible opposing jaws positioned at the distal end of said endoscopic section and adapted for reception of said clips;
      iv) an escapement positioned adjacent the distal end of said clip track and extending into said clip path in contact with said distal-most clip;
      v) a pusher bar having a substantially planar proximal portion and extending substantially parallel to said clip path, said pusher bar moving from a proximal position to a distal position to advance said distal-most clip to a position within said pair of jaws; and
      vi) a cam channel including a substantially planar proximal portion and a distal portion which at least partially surrounds said flexible opposing jaws, said cam channel extending substantially parallel to said clip path and moving from a proximal position to a distal position to cam said flexible opposing jaws into a closed configuration; and
   vii) a sealing block defining an opening through which said substantially planar proximal portion of said pusher bar and said substantially planar proximal portion of said cam channel extend, said sealing block, said substantially planar proximal portion of said pusher bar, and said substantially planar proximal portion of said cam channel cooperating to inhibit gas flow through said opening.

2. A method for endoscopically applying surgical clips to body tissue comprising:
   a) providing an endoscopic multiple clip applier having a frame and at least one actuating member mounted to said frame, and an endoscopic shaft mounted to said frame within which are stored a plurality of surgical clips, said endoscopic shaft having flexible opposing jaws positioned at the distal end portion thereof and adapted for sequential reception of said surgical clips;
   b) inserting said endoscopic shaft through a tubular sleeve in sealing engagement therewith;
   c) actuating said at least one actuating member, thereby distally advancing one of said surgical clips into said flexible opposing jaws;
   d) at least partially closing said one of said surgical clips after advancing said one of said surgical clips to said flexible opposing jaws at least sufficient to grip the tissue while maintaining said one of said surgical clips in position adjacent the tissue.

3. A method, for endoscopically applying surgical clips to body tissue comprising:
   a) providing an endoscopic multiple clip applier having a frame and at least one actuating member mounted to said frame, and an endoscopic shaft mounted to said frame within which are stored a plurality of surgical clips, said endoscopic shaft having flexible opposing jaws positioned at the distal end portion thereof and adapted for sequential reception of said surgical clips;
   b) inserting said endoscopic shaft through a tubular sleeve in sealing engagement therewith;
   c) selectively actuating said at least one actuating member, thereby distally advancing one of said surgical clips into said flexible opposing jaws;
   d) positioning said flexible opposing jaws and said one of said surgical clips positioned therein adjacent the body tissue to be clipped; and
   e) at least partially closing said flexible opposing jaws at least sufficient to cause said one of said surgical clips positioned therein to grip the tissue while maintaining said one of said surgical clips in position relative to the tissue.

4. A method for endoscopically applying surgical clips to body tissue with an apparatus having an endoscopic section including a clip track within which are stored a plurality of surgical clips, said endoscopic section connected at the proximal end thereof to a frame configured and dimensioned to be gripped by hand, and having jaws positioned at the distal end thereof and adapted for individual reception and at least partial closing of said surgical clips, and pusher means for advancing said surgical clips distally into said jaws, comprising:
   a) positioning cannula means within an aperture in the body;
   b) gripping said frame by hand;
   c) inserting said elongated endoscopic section into said cannula means;
   d) selectively causing one of said surgical clips to advance individually and distally from said clip track into said jaws;
   e) positioning said jaws and said one of said surgical clips positioned therebetween adjacent the body tissue to be clipped; and
   f) at least partially closing said jaws at least sufficient to cause said one of said surgical clips positioned therebetween to grip the tissue while causing said pusher means to move to a position proximal of a next clip so as to facilitate advancement of the next clip distally into said jaws.

5. An apparatus for applying surgical clips to body tissue, which comprises:

a) a frame adapted to be gripped by hand;

b) an elongated endoscopic shaft having a longitudinal axis and extending distally from the frame;

c) a clip track positioned within the endoscopic shaft;

d) a plurality of u-shaped clips longitudinally aligned in an array in contact with the clip track;

e) a pair of flexible opposing jaws positioned at and extending distally from the endoscopic shaft;

f) a cam channel extending within and along the longitudinal axis of the endoscopic shaft and at least partially surrounding the flexible opposing jaws, the cam channel moving with respect to the endoscopic shaft to close the flexible opposing jaws; g) an escapement positioned within the endoscopic shaft and extending into the clip track;

h) a pusher bar extending within and along the longitudinal axis of the endoscopic shaft and moving with respect to the clip track to advance a clip into the flexible opposing jaws; and i) a sealing block positioned within the endoscopic shaft proximal of the clip track which defines a substantially rectangular opening through which the cam channel and the pusher bar extend in close contiguity.

6. The apparatus of claim 5, wherein the cam channel and pusher bar are in side-by-side contact as they extend through the substantially rectangular opening in the sealing block.

7. The apparatus of claim 5, further comprising silicone grease within the opening in the sealing block.

8. The apparatus of claim 5, wherein a portion of the cam channel moves through the opening in the sealing block as the cam channel closes the flexible opposing jaws and a portion of the pusher bar moves through the opening in the sealing block as the pusher bar advances a clip into the flexible opposing jaws.

9. The apparatus of claim 8, wherein the respective portions of the cam channel and the pusher bar which move through the opening in the sealing block have rectangular cross-sections.

* * * * *